(12) United States Patent
Gabel

(10) Patent No.: US 9,763,271 B1
(45) Date of Patent: Sep. 12, 2017

(54) NETWORKED WI-FI STATIONS HAVING MULTI-LEVEL DISPLAYS AND MULTIPLE ANTENNAS

(71) Applicant: Minutepros.com Corp., Santa Monica, CA (US)

(72) Inventor: Gershon Gabel, Santa Monica, CA (US)

(73) Assignee: MINUTEPROS.COM CORP., Santa Monica, CA (US)

( * ) Notice: Subject to any disclaimer, the term of this patent is extended or adjusted under 35 U.S.C. 154(b) by 0 days.

(21) Appl. No.: 15/190,976

(22) Filed: Jun. 23, 2016

(51) Int. Cl.
| | |
|---|---|
| *G06F 17/24* | (2006.01) |
| *H04W 76/02* | (2009.01) |
| *G06F 3/16* | (2006.01) |
| *H04N 1/12* | (2006.01) |
| *H04W 4/02* | (2009.01) |
| *G06Q 30/08* | (2012.01) |
| *H04W 84/12* | (2009.01) |
| *H04W 88/08* | (2009.01) |

(52) U.S. Cl.
CPC ............ *H04W 76/02* (2013.01); *G06F 3/167* (2013.01); *G06Q 30/08* (2013.01); *H04N 1/121* (2013.01); *H04W 4/02* (2013.01); *G06F 17/243* (2013.01); *H04N 2201/04* (2013.01); *H04W 84/12* (2013.01); *H04W 88/08* (2013.01)

(58) Field of Classification Search
CPC .......... G08B 25/10; G08B 25/14; H04W 4/22
See application file for complete search history.

(56) References Cited

U.S. PATENT DOCUMENTS

| | | |
|---|---|---|
| 6,405,033 B1 | 6/2002 | Kennedy, III |
| 6,658,389 B1 | 12/2003 | Alpdemir |
| 7,016,897 B2 | 3/2006 | Hill et al. |
| 7,398,461 B1 | 7/2008 | Broder et al. |
| 7,702,524 B1 | 4/2010 | Whibbs et al. |
| 7,752,054 B1 | 7/2010 | Anthony-Hoppe et al. |
| 7,769,826 B2 | 8/2010 | Gustafsson |

(Continued)

FOREIGN PATENT DOCUMENTS

| | | |
|---|---|---|
| JP | 06-119578 A | 4/1994 |
| JP | 5151799 B2 | 2/2013 |

(Continued)

OTHER PUBLICATIONS

U.S. Appl. No. 62/048,834, filed Feb. 11, 2106, Gabel.

(Continued)

*Primary Examiner* — Ryan Pitaro
(74) *Attorney, Agent, or Firm* — Knobbe, Martens, Olson & Bear LLP

(57) ABSTRACT

A kiosk system is described that may have multilevel displays and multiple network antennas. Upper level displays may be non-touch and a lower level display may include a touch display. The upper level displays may be affixed to a body of the kiosk using brackets. The kiosk may include first and second network interfaces. The first network interface may be provided to enable user terminals local to the kiosk to wirelessly access network resources via the kiosk system. The second network interface may enable the kiosk to access a remote system. The kiosk may be equipped with a camera, microphone, and/or a speaker.

13 Claims, 8 Drawing Sheets

(56) References Cited

U.S. PATENT DOCUMENTS

| | | | |
|---|---|---|---|
| 8,175,230 B2* | 5/2012 | Bangalore | G06Q 10/06311 358/1.18 |
| 9,330,275 B1 | 5/2016 | Endresen | |
| 9,412,103 B1 | 8/2016 | d'Escragnolle | |
| 9,426,638 B1* | 8/2016 | Johnson | H04W 4/22 |
| 2001/0044735 A1 | 11/2001 | Colburn et al. | |
| 2002/0038233 A1 | 3/2002 | Shubov et al. | |
| 2002/0059084 A1 | 5/2002 | Wahlbin | |
| 2002/0091879 A1 | 7/2002 | Beriker | |
| 2002/0115423 A1 | 8/2002 | Hatae et al. | |
| 2003/0028406 A1 | 2/2003 | Herz et al. | |
| 2003/0069744 A1 | 4/2003 | Craig et al. | |
| 2003/0149577 A1 | 8/2003 | Young et al. | |
| 2004/0083395 A1 | 4/2004 | Blechman | |
| 2004/0087301 A1 | 5/2004 | Tobin | |
| 2004/0093280 A1 | 5/2004 | Yamaguchi | |
| 2005/0010563 A1 | 1/2005 | Gross et al. | |
| 2005/0033641 A1 | 2/2005 | Jha et al. | |
| 2005/0035208 A1 | 2/2005 | Elliot | |
| 2005/0099272 A1 | 5/2005 | Kuo | |
| 2005/0102159 A1 | 5/2005 | Mondshine | |
| 2006/0085216 A1 | 4/2006 | Guerrero | |
| 2006/0108063 A1 | 5/2006 | Umemoto et al. | |
| 2006/0193004 A1* | 8/2006 | Wasilewski | H04N 1/00127 358/1.15 |
| 2007/0011128 A1 | 1/2007 | Meyers | |
| 2007/0176743 A1* | 8/2007 | Murphy | H04W 84/027 340/7.29 |
| 2007/0179818 A1 | 8/2007 | Magnus | |
| 2007/0179845 A1 | 8/2007 | Jain | |
| 2007/0179846 A1 | 8/2007 | Jain et al. | |
| 2007/0179847 A1 | 8/2007 | Jain | |
| 2007/0179848 A1 | 8/2007 | Jain et al. | |
| 2007/0179849 A1 | 8/2007 | Jain | |
| 2007/0179853 A1 | 8/2007 | Feige et al. | |
| 2007/0260520 A1 | 11/2007 | Jha et al. | |
| 2007/0294258 A1 | 12/2007 | Caldwell | |
| 2008/0065726 A1 | 3/2008 | Schoenberg | |
| 2008/0103823 A1 | 5/2008 | Papa | |
| 2008/0192129 A1 | 8/2008 | Walker | |
| 2008/0306996 A1 | 12/2008 | McClellan et al. | |
| 2009/0198521 A1 | 8/2009 | Barker | |
| 2009/0276708 A1 | 11/2009 | Smith | |
| 2010/0004989 A1 | 1/2010 | Bonalle et al. | |
| 2010/0231714 A1* | 9/2010 | Flores | G08B 13/19613 348/143 |
| 2011/0058326 A1* | 3/2011 | Idems | G09F 9/30 361/679.21 |
| 2011/0099116 A1 | 4/2011 | Gabel | |
| 2011/0173549 A1* | 7/2011 | Hipskind | G06Q 20/1085 715/756 |
| 2011/0222784 A1* | 9/2011 | Rowe | G06F 3/04886 382/218 |
| 2011/0290871 A1 | 12/2011 | Jon | |
| 2012/0109690 A1 | 5/2012 | Weinrauch | |
| 2012/0129577 A1* | 5/2012 | Vaknin | H02J 7/0027 455/573 |
| 2012/0232980 A1* | 9/2012 | Wald | G06Q 30/0233 705/14.27 |
| 2012/0322401 A1* | 12/2012 | Collins | H04W 4/22 455/404.1 |
| 2013/0078916 A1 | 3/2013 | Glickman | |
| 2013/0173287 A1* | 7/2013 | Cashman | E04H 3/08 705/2 |
| 2013/0182002 A1 | 7/2013 | Macciola | |
| 2013/0263227 A1* | 10/2013 | Gongaware | H04L 63/08 726/4 |
| 2013/0297353 A1 | 11/2013 | Strange | |
| 2013/0325943 A1* | 12/2013 | Al-Harthi | G06Q 50/01 709/204 |
| 2013/0335027 A1 | 12/2013 | Xin | |
| 2014/0040287 A1 | 2/2014 | Frome | |
| 2014/0114691 A1 | 4/2014 | Pearce | |
| 2014/0203071 A1 | 7/2014 | Eggert | |
| 2014/0297100 A1* | 10/2014 | Miura | H04W 4/22 701/31.5 |
| 2014/0365281 A1 | 12/2014 | Onischuk | |
| 2014/0368601 A1 | 12/2014 | deCharms | |
| 2015/0009327 A1 | 1/2015 | Love | |
| 2015/0026174 A1 | 1/2015 | Nuggehalli | |
| 2015/0081362 A1 | 3/2015 | Chadwick | |
| 2015/0127570 A1 | 5/2015 | Doughty | |
| 2015/0172894 A1 | 6/2015 | Gabel | |
| 2015/0223348 A1 | 8/2015 | Sagar et al. | |
| 2015/0294431 A1* | 10/2015 | Fiorucci | G06Q 50/26 705/13 |
| 2015/0339888 A1 | 11/2015 | Hong et al. | |
| 2015/0341225 A1 | 11/2015 | Baarman | |
| 2015/0350463 A1 | 12/2015 | Moore | |
| 2016/0098690 A1 | 4/2016 | Silva et al. | |
| 2016/0132849 A1 | 5/2016 | Melo et al. | |
| 2016/0154991 A1 | 6/2016 | Berini et al. | |
| 2016/0171596 A1 | 6/2016 | Angerbauer et al. | |
| 2016/0294199 A1* | 10/2016 | Poffinbarger, II | H02J 7/0027 |

FOREIGN PATENT DOCUMENTS

| | | |
|---|---|---|
| KR | 10-2003-0008655 A | 1/2003 |
| KR | 10-1095156 B1 | 12/2011 |
| WO | WO 2015/0095235 | 6/2015 |

OTHER PUBLICATIONS

U.S. Appl. No. 15/048,834, filed Feb. 19, 2016, Gabel.

HispanicMarketWeekly, Referral Services: Legal and Medical, Published: Apr. 3, 2008 (http://www.hispanicmarketweekly.com/featureArticle.cms?Id=972&mode=print), 2 pages.

International Search Report for International Application No. PCT/US2014/070670, mailed Apr. 13, 2015, 3 pp.

LegalMatch, Find the Right Lawyer Now!, Copyright 1999-2010 (http://web.archive.org/web/20091027232223/http://www.legalmatch.com/), 1 page.

Office Action from Mexican Patent Application No. MX/a/2010/010404, dated Sep. 1, 2012, 3 pages.

Written Opinion of the International Searching Authority for International Application No. PCT/US2014/070670, mailed Apr. 13, 2015, 6 pp.

* cited by examiner

US 9,763,271 B1

NETWORKED WI-FI STATIONS HAVING MULTI-LEVEL DISPLAYS AND MULTIPLE ANTENNAS

BACKGROUND OF THE INVENTION

Field of the Invention

This disclosure relates in general to the field of communications and, more particularly, to managing and distributing content via a network environment.

Description of the Related Art

Broadband networks have become ever more important to adequately access online environments. However, large numbers of people still do not have ready access to broadband networks and so are precluded from adequately accessing many online services.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the disclosure relates to a kiosk, the kiosk comprising: a body; an antenna mounted to the body; two or more weather-sealed displays attached, using bolts and/or brackets, to the body above a first vertical level, wherein display portions of the two or more weather-sealed displays attached to the body above the first vertical level are non-touch and optionally the first vertical level is at least 4 feet; a first wireless network interface coupled to the antenna; a second network interface; a weather-sealed touch display positioned at a second level lower than the first level; a camera; a microphone; a computing system comprising at least a computing device and non-transitory memory that stores program instructions executable by the computing device to perform operations comprising: enable user terminals to wirelessly connect to the first wireless network interface; receive via the second network interface content from a remote system; display at least a portion of the received content on the two or more weather-sealed non-touch displays attached to the body above the first vertical level; display an accident, immigration, and/or matrimonial incident reporting user interface via the touch display positioned at the second level; populate at least a portion of the reporting user interface with a user input provided via a keyboard and/or via the microphone; perform a geolocation operation to determine location information related to the report; securely transmit using the second network interface at least a portion of the user input used to populate the reporting user interface and the location information to a remote system.

Optionally, the user input used to populate the accident reporting user interface comprises user contact information, accident location information, an indication as to whether the user was a driver of a vehicle involved in the accident, an indication as to how many people were injured in the accident, a description on injuries, a description of property damage, media recordings related to the accident, insurance information, whether the user is above a first age, whether the user is a citizen of the country where the accident occurred, whether the user is lawfully in the country where the accident occurred.

Optionally, at least partly in response to receiving user input used to populate the reporting user interface, the remote system: identifies service providers that can provide service related to the reported incident to the user that meet one or more criteria; transmits over a network a notification to destinations associated with the identified service providers regarding: the reported incident subject matter, a start time for a reverse auction to bid on providing the user with reported incident related service, an auction length, a bid period, and a bid emolument that will be charged for a submitted bid, the notification further comprising a control via which a service provider may indicate an interest in participating in the reverse auction; at least partly in response to an interest indication received from a given service provider terminal, provides the given service provider via a service provider terminal with anonymized user reported information; in response to receipt of a first bid comprising a first bid amount, transmits the first bid amount to destinations associated with service providers that indicated an interest in participating in the reverse auction, wherein the first bid amount is displayed in association with a countdown clock corresponding to the bid period; determines whether another bid for a bid amount lower than the first bid amount was received within the bid period; at least partly in response to a determination that another bid for a bid amount lower than the first bid amount was not received within the bid period, terminates the auction; transmits to the user terminal a subset of the bids received in association with information, including a respective service provider website link, regarding the service providers that submitted the subset of bids; receives a bid selection by the user; transmits non-anonymized user reported information to the service provider that submitted the bid selected by the user.

Optionally, at least partly in response to receiving user input used to populate the reporting user interface, the remote system: identifies a first plurality of service providers that can provide service related to the reported incident to the user that meet one or more criteria; transmits over a network a notification to destinations associated with the identified first plurality of service providers regarding: the reported incident subject matter, a start time for a reverse auction to bid on providing the user with a report incident related service, an auction length, a bid period, and a bid emolument that will be charged for a submitted bid; provides at least a portion of the first plurality of service providers with anonymized user reported information; in response to receipt of a first bid comprising a first bid amount, transmits the first bid amount to destinations associated with at least a portion of the first plurality of service providers, wherein the first bid amount is displayed in association with a countdown clock corresponding to the bid period; determines whether another bid for a bid amount lower than the first bid amount was received within the bid period; at least partly in response to a determination that another bid for a bid amount lower than the first bid amount was not received within the bid period, terminates the auction; transmits to the user terminal at least a portion of the bids received in association with information, including a respective service provider website link, regarding respective service providers;

receives a bid selection by the user; determines whether the user has selected the lowest bid; at least partly in response to determining that the user has not selected the lowest bid, refunding bid emoluments to the service provider that provided the lowest bid; transmits non-anonymized user reported information to the service provider that submitted the bid selected by the user.

Optionally, at least partly in response to receiving user input used to populate the reporting user interface, the remote system: identifies a first plurality of service providers that can provide service related to the reported incident to the user that meet one or more criteria; transmits a notification to destinations associated with the identified first plurality of service providers regarding: the reported incident subject matter, a start time for a reverse auction to bid on providing the user with a report related service, an auction length, a bid period, and a bid emolument that will be charged for a submitted bid; provides at least a portion of the first plurality of service providers with anonymized user reported information; in response to receipt of a first bid comprising a first bid amount, transmits the first bid amount to destinations associated with at least a portion of the first plurality of service providers, wherein the first bid amount is displayed in association with a countdown clock corresponding to the bid period; determines whether another bid for a bid amount lower than the first bid amount was received within the bid period; at least partly in response to a determination that another bid for a bid amount lower than the first bid amount was not received within the bid period, terminates the auction; transmits to the user terminal at least a subset of the bids received in association with information, including a respective service provider website link, regarding the service providers that submitted the subset of bids; determines that the user has declined to accept a bid from the subset of bids; if the user has declined to accept a bid from the subset of bids, refund bid emoluments to the service providers that were charged emoluments for submitting bids.

Optionally, at least partly in response to receiving user input used to populate the reporting user interface, the remote system: identifies a first plurality of service providers that can provide service related to the reported incident to the user that meet one or more criteria; transmits a notification to destinations associated with the identified first plurality of service providers regarding: the reported incident subject matter, a start time for a reverse auction to bid on providing the user with a reported incident related service, an auction length, a bid period, and a bid emolument that will be charged for a submitted bid; provides at least a portion of the first plurality of service providers with anonymized user reported information; in response to receipt of a first bid comprising a first bid amount, transmits the first bid amount to destinations associated with at least a portion of the first plurality of service providers, wherein the first bid amount is displayed in association with a countdown clock corresponding to the bid period; determines whether another bid for a bid amount lower than the first bid amount was received within the bid period; at least partly in response to a determination that another bid for a bid amount lower than the first bid amount was not received within the bid period, terminates the auction; transmits to the user terminal a subset of the bids received in association with information, including a respective service provider website link, regarding the service providers that submitted the subset of bids; determines that the user has declined to accept a bid from the subset of bids; determines whether more than a first threshold number of service providers submitted bids; at least partly in response to determining that more than the first threshold number of service providers submitted bids and the user has declined to accept a bid from the subset of bids, refunds bid emoluments to the service providers that were charged emoluments for submitting bids and charges the user a emolument.

Optionally, at least partly in response to receiving user input used to populate the reporting user interface, the remote system: identifies service providers that can provide service related to the reported incident to the user that meet one or more criteria; transmits over a network a notification to destinations associated with the identified service providers regarding: the reported incident subject matter, a start time for a reverse auction to bid on providing the user with reported incident related service, and a bid emolument that will be charged for a submitted bid; provides one or more of the identified service provider, via a service provider terminal, with anonymized user reported information; transmits to the user terminal at least a subset of the bids received in association with information regarding the service providers that submitted the subset of bids; receives a bid selection by the user; transmits non-anonymized user reported information to the service provider that submitted the bid selected by the user.

Optionally, the kiosk further comprises: a document scanner comprising a document feeder, wherein the document scanner is configured to receive the document via the document feeder, identify a document type for the document, and dynamically determine an image compression level based at least in part on the document type. Optionally, kiosk system is configured to detect an accident based at least in part on audible sounds received by the microphone, wherein based at least in part on the detected accident, content is selected and displayed via at least one of the kiosk system displays. Optionally, the kiosk further comprises or is in operative communication with a speech recognition system, the speech recognition system configured to receive user voice input and to populate one or more accident reporting user interface fields.

An aspect of the disclosure relates to a terminal system, comprising: a body; a plurality of antennas mounted to or within the body (e.g., Wi-Fi, Bluetooth, and/or cellular antennas); at least one touch display; a first wireless network interface coupled to a first of the plurality of antennas; a second wireless network interface coupled to a second of the plurality of antennas; a camera; a microphone; a computing system comprising at least a computing device and non-transitory memory that stores program instructions executable by the computing device to perform operations comprising: enable electronic devices to wirelessly connect to the first wireless network interface; receive via the second wireless network interface content from a remote system; display at least a portion of the received content on the touch display; display an accident, immigration, and/or matrimonial incident reporting user interface via the touch display; populate at least a portion of the reporting user interface with a user input provided via a keyboard and/or via the microphone; perform a geolocation operation to determine location information related to the report; securely transmit using the second wireless network interface at least a portion of the user input used to populate the reporting user interface and the location information to a remote system.

Optionally, with respect to the terminal system, the user input used to populate the accident reporting user interface comprises user contact information, accident location information, an indication as to whether the user was a driver of a vehicle involved in the accident, an indication as to how many people were injured in the accident, a description on injuries, a description of property damage, media recordings related to the accident, insurance information, whether the user is above a first age, whether the user is a citizen of the country where the accident occurred, whether the user is lawfully in the country where the accident occurred.

Optionally, at least partly in response to receiving user input used to populate the reporting user interface, the remote system: identifies service providers that can provide service related to the reported incident to the user that meet one or more criteria; transmits over a network a notification to destinations associated with the identified service providers regarding: the reported incident subject matter, a start time for a reverse auction to bid on providing the user with reported incident related service, an auction length, a bid period, and a bid emolument that will be charged for a submitted bid, the notification further comprising a control via which a service provider may indicate an interest in participating in the reverse auction; at least partly in response to an interest indication received from a given service provider terminal, provides the given service provider via a service provider terminal with anonymized user reported information; in response to receipt of a first bid comprising a first bid amount, transmits the first bid amount to destinations associated with service providers that indicated an interest in participating in the reverse auction, wherein the first bid amount is displayed in association with a countdown clock corresponding to the bid period; determines whether another bid for a bid amount lower than the first bid amount was received within the bid period; at least partly in response to a determination that another bid for a bid amount lower than the first bid amount was not received within the bid period, terminates the auction; transmits to the user terminal a subset of the bids received in association with information, including a respective service provider website link, regarding the service providers that submitted the subset of bids; receives a bid selection by the user; transmits non-anonymized user reported information to the service provider that submitted the bid selected by the user.

Optionally, at least partly in response to receiving user input used to populate the reporting user interface, the remote system: identifies a first plurality of service providers that can provide service related to the reported incident to the user that meet one or more criteria; transmits over a network a notification to destinations associated with the identified first plurality of service providers regarding: the reported incident subject matter, a start time for a reverse auction to bid on providing the user with a report incident related service, an auction length, a bid period, and a bid emolument that will be charged for a submitted bid; provides at least a portion of the first plurality of service providers with anonymized user reported information; in response to receipt of a first bid comprising a first bid amount, transmits the first bid amount to destinations associated with at least a portion of the first plurality of service providers, wherein the first bid amount is displayed in association with a countdown clock corresponding to the bid period; determines whether another bid for a bid amount lower than the first bid amount was received within the bid period; at least partly in response to a determination that another bid for a bid amount lower than the first bid amount was not received within the bid period, terminates the auction; transmits to the user terminal at least a portion of the bids received in association with information, including a respective service provider website link, regarding respective service providers; receives a bid selection by the user; determines whether the user has selected the lowest bid; at least partly in response to determining that the user has not selected the lowest bid, refunding bid emoluments to the service provider that provided the lowest bid; transmits non-anonymized user reported information to the service provider that submitted the bid selected by the user.

Optionally, at least partly in response to receiving user input used to populate the reporting user interface, the remote system: identifies a first plurality of service providers that can provide service related to the reported incident to the user that meet one or more criteria; transmits a notification to destinations associated with the identified first plurality of service providers regarding: the reported incident subject matter, a start time for a reverse auction to bid on providing the user with a report related service, an auction length, a bid period, and a bid emolument that will be charged for a submitted bid; provides at least a portion of the first plurality of service providers with anonymized user reported information; in response to receipt of a first bid comprising a first bid amount, transmits the first bid amount to destinations associated with at least a portion of the first plurality of service providers, wherein the first bid amount is displayed in association with a countdown clock corresponding to the bid period; determines whether another bid for a bid amount lower than the first bid amount was received within the bid period; at least partly in response to a determination that another bid for a bid amount lower than the first bid amount was not received within the bid period, terminates the auction; transmits to the user terminal at least a subset of the bids received in association with information, including a respective service provider website link, regarding the service providers that submitted the subset of bids; determines that the user has declined to accept a bid from the subset of bids; if the user has declined to accept a bid from the subset of bids, refund bid emoluments to the service providers that were charged emoluments for submitting bids.

Optionally, at least partly in response to receiving user input used to populate the reporting user interface, the remote system: identifies a first plurality of service providers that can provide service related to the reported incident to the user that meet one or more criteria; transmits a notification to destinations associated with the identified first plurality of service providers regarding: the reported incident subject matter, a start time for a reverse auction to bid on providing the user with a reported incident related service, an auction length, a bid period, and a bid emolument that will be charged for a submitted bid; provides at least a portion of the first plurality of service providers with anonymized user reported information; in response to receipt of a first bid comprising a first bid amount, transmits the first bid amount to destinations associated with at least a portion of the first plurality of service providers, wherein the first bid amount is displayed in association with a countdown clock corresponding to the bid period; determines whether another bid for a bid amount lower than the first bid amount was received within the bid period; at least partly in response to a determination that another bid for a bid amount lower than the first bid amount was not received within the bid period, terminates the auction; transmits to the user terminal a subset of the bids received in association with information, including a respective service provider website link, regarding the service providers that submitted the subset of bids; determines that the user has declined to accept a bid from the subset of bids; determines whether more than a first threshold number of service providers submitted bids; at least partly in response to determining that more than the first threshold number of service providers submitted bids and the user has declined to accept a bid from the subset of bids, refunds bid emoluments to the service providers that were charged emoluments for submitting bids and charges the user a emolument.

Optionally, at least partly in response to receiving user input used to populate the reporting user interface, the remote system: identifies service providers that can provide service related to the reported incident to the user that meet one or more criteria; transmits over a network a notification to destinations associated with the identified service providers regarding: the reported incident subject matter, a start time for a reverse auction to bid on providing the user with reported incident related service, and a bid emolument that will be charged for a submitted bid; provides one or more of the identified service provider, via a service provider terminal, with anonymized user reported information; transmits to the user terminal at least a subset of the bids received in association with information regarding the service providers that submitted the subset of bids; receives a bid selection by the user; transmits non-anonymized user reported information to the service provider that submitted the bid selected by the user.

Optionally, the terminal system further comprises: a document scanner comprising a document feeder, wherein the document scanner is configured to receive the document via the document feeder, identify a document type for the document, and dynamically determine an image compression level based at least in part on the document type. Optionally, the terminal system is configured to detect an accident based at least in part on audible sounds received by the microphone, wherein based at least in part on the detected accident, content is selected and displayed via the touch display. Optionally, the terminal system further comprises or is in wireless communication with a speech recognition system, the speech recognition system configured to receive user voice input and to populate one or more accident reporting user interface fields.

BRIEF DESCRIPTION OF THE DRAWINGS

Embodiments will now be described with reference to the drawings summarized below. These drawings and the associated description are provided to illustrate example embodiments, and not to limit the scope of the invention.

DETAILED DESCRIPTION

Figure 1:
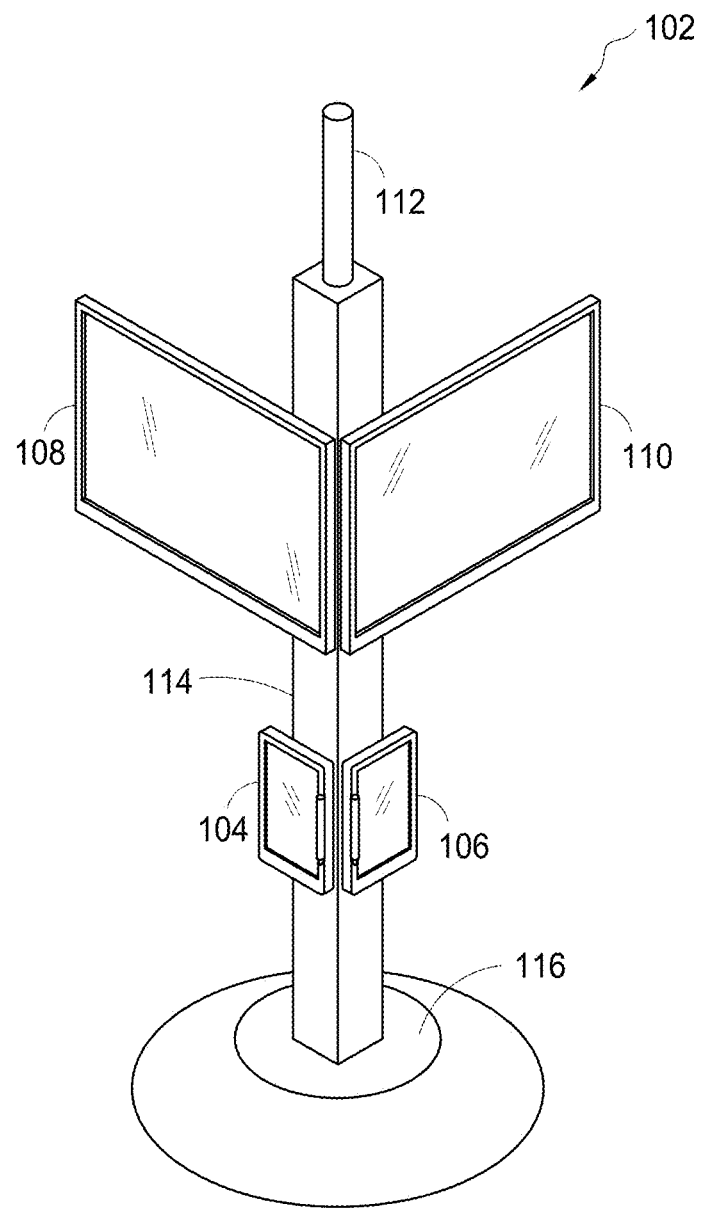
FIG. 1 illustrates an example kiosk.

A kiosk system is described that is configured to provide wireless network access to user devices, to display data on one or more displays, to interact with a user, to capture images, and/or to provide telephony services.

Systems and methods are disclosed for collecting and distributing information over a network, such as a data network and/or a telephony network via a kiosk or user terminal. For example, access to certain online services may be provided via distributed networked kiosks. The kiosks may be configured as a Wi-Fi hotspot, with a high speed (e.g., gigabit or higher) Wi-Fi network interface (including a Wi-Fi transceiver), and may provide wireless Internet access to user devices configured with Wi-Fi interfaces (e.g., phones, tablets, cars, etc.). The kiosk may be coupled to the Internet via a wired or wireless interface. The kiosk may encrypt communications from the kiosk to user devices and to remote systems (e.g., a cloud-based system that receives data/documents from the kiosk, and transmits data/documents to the kiosk), and decrypt communications received at the kiosk from user devices and remote systems. The kiosk may have a Wi-Fi range of 25 feet, 50 feet, 150, 200 feet, 500 feet or even greater range. The kiosk may be equipped with one or more large, prominently positioned upper level displays (e.g., flat panel LCD, OLED, plasma, or other display type). For example, there may be one, two, three of four upper level displays, which may be positioned on respective sides of the kiosk to enhance visibility to passerby's.

The displays may be configured to display content (e.g., informational content, entertainment content, ads, or other content) received over the Internet (or other wired or wireless network). If there are two or more upper level displays, they may be used to display the same content at the same time or different content at a given point in time. The upper level displays may be positioned between 4-20 feet above the surface on which the kiosk is mounted/seated (e.g., 4 feet, 5 feet, 6 feet, 7 feet, 8 feet, 9 feet, 10 feet, 11 feet, 12 feet, 13 feet, 14 feet, 15 feet, 16 feet, 16 feet, 17 feet, 18 feet, 18 feet, 19 feet, 20 feet). Several items of the content may be periodically downloaded to the kiosk computing device from one or more remote systems. In addition, instructions may transmitted to the kiosk computing device indicating when a given item of content is to be displayed, for how long a given item is to be displayed, on which displays the content is to be displayed, a display cycle, and/or an end display time. For example, the instructions may indicate that a first item of content is to be first displayed on a first upper level display at a designated date and time for a specified period of time (e.g., 12 seconds), that the content is to be repeatedly displayed once every minute for the specified period of time, and that the content is to be no longer displayed at a specified end date and time. By way of further example, rather than specify a display cycle, the instructions may specify specific times and/or dates the content is to be displayed (e.g., at 9 AM, 9:30 AM, LOAM, 12 PM, 12:30 PM, 1:00 PM, 5:00 PM, etc.) and optionally the instructions may specify the same or different display period of time for each specific time and/or for each kiosk display.

The kiosk may be equipped with a touch screen display/ user interface coupled to a computing device. The touch screen display may be positioned lower than the upper level displays, at a position configured to be easily accessible to a user standing in front of the kiosk. For example, the touch screen display may be positioned between 2 and 5 feet above the surface on which the kiosk is mounted/seated. There may be more than one touch screen display. For example, one touch screen display may be positioned for easy access by a user in a wheelchair and another touch screen display may be positioned for easy access by a standing user. Optionally, the lower level display may be height adjustable via rails or otherwise to accommodate a standing or sitting person.

The computing device may optionally be equipped with a physical keyboard. The computing device may be configured to execute applications, display user interfaces via the touch screen, and receive user inputs via the touch screen. The computing device may host a browser that provides access to remote networked resources. The user interfaces may include icons, tiles, links, text, videos, photos, telephone style keyboard, a virtual computer style keyboard, emergency call controls (e.g., a 911 button to place a call for police, ambulance, and/or fire department), or any combination thereof. The kiosk may also be configured with a microphone and speaker coupled to the computing device. The computing device may implement a VoIP phone using the speaker and microphone to enable a user to place and receive phone calls. The microphone and speaker may also be used to provide a voice command and response system. The kiosk may also be equipped with a camera coupled to the computing device. The camera may be utilized for video calls or to capture images (e.g., photographic images), such as images of documents and/or users. In addition, the kiosk may include a printer, which may be used to print documents, such as maps, receipts, and/or other documents.

The kiosk may include a scanner (e.g., a fax scanner coupled to a fax machine, a non-fax document scanner), optionally including a document feeder, in addition to a camera. The scanner may compress scanned documents to reduce the document image file size, thereby reducing memory needed to store such a file, and/or to reduce the network bandwidth needed to transmit the image file over a wireless or wired network. Scanning compression may be dynamically set higher for text documents (whose background typically do not contain relevant information and so may be highly compression) than for photographic documents (where compression may unacceptably reduce image quality). Optionally, the kiosk includes one or more biometric sensors (e.g., fingerprint scanner, iris/retinal scanner, etc.), which may be used to a enable a user to access secure sites and services, and/or to electronically sign documents.

As noted, the kiosk computing device may be configured to execute an application. A version of the application may be configured to execute on a user device (e.g., as an app for a portable device, such as a phone or tablet app). The application may be configured with fields and controls configured to enable a user to request an on-demand professional or other service. The functionality of the application may be described via the upper level displays. For example, the upper level displays may provide content indicating that the kiosk may be used to retain services of a given type (e.g., a lawyer, a bail bondsman, doctor, etc.) and/or sub-type (e.g., for a lawyer: an immigration lawyer, a personal injury lawyer, a workman compensation lawyer, a divorce lawyer, a landlord-tenant lawyer, a tax lawyer, etc.; for a doctor: an orthopedist, a surgeon, a family doctor, a psychiatrist, a psychologist, etc.).

The timing of a given item of content displayed on an upper level display may be on a fixed schedule or may be dynamically determined. For example, the content may be selected for display at least partly in response to substantially real-time events (e.g., events that have occurred within the past 15 minutes, 30 minutes, or 60 minutes), substantially current events (e.g., in the last 1 hour, last 24 hours, last week), or other events. By way of illustration, if an accident that has occurred in the last 30 minutes has been detected, the content selected for display on an upper level display may be for a personal injury lawyer or orthopedic doctor, whose services may be particularly useful to someone that has just been in an accident. Such content may be periodically displayed for a specified period of time at a specified frequency. For example, the content may be displayed every 5 minutes for at least 1 hour after an accident has been detected.

By way of further example, if it has been determined that an area from which the upper level displays is visible has more than a threshold number of vehicle related accidents within a specified period of time, then the content selected for display on an upper level display may be for an orthopedic doctor, a personal injury lawyer or a body shop, whose services may be particularly useful to someone that has just been in an accident.

By way of illustration, accident data may be accessed, optionally in substantially real time, via one or more data stores, accident broadcast services, traffic services, navigation services, and/or video cameras positioned to capture images of road traffic. The accident data may optionally be accessed via web services and/or data files (e.g., a JSON file, a text file, or other file type). The accident data may include the location of the accident (e.g., in the form of street name(s), addresses, latitude and longitude, map grid identifier, or otherwise).

There may be a plurality of kiosk computing devices distributed over a small or large geographical area. For example, there may be kiosk devices located at various street corners (see, e.g., FIG. 4) or other locations across a city or portions thereof. Optionally, all of a given set of kiosk computing devices may display the same content on their respective upper level displays at about the same time. For example, a set of kiosks may include all kiosks within a specified geographic area (e.g., within four city blocks, within a 0.5 mile radius, etc. of a given point), or the set may comprise spaced apart kiosks (e.g., every third kiosk within a one mile radius of a central point). Optionally, each of a given set of kiosk computing devices may be individually configured to display content on their respective upper level displays, so that one kiosk computing device may display different content than another kiosk computing device at a given point in time. Optionally, a given kiosk computing device may host the same or a different set applications as another kiosk computing device.

An example kiosk computing device application, configured to enable a user to request services (e.g., profession services) and application environment will now be described. Optionally, rather than utilizing a dedicated application, the various user interfaces and services may be provided by a remote system (e.g., a cloud-based system) and accessed via a browser or the like.

The kiosk may host an operating system. For example, the operating system may be a Windows, Unix, Linux, Android, Ubuntu, or other operating system. The operating system may include a kernel including a variety of drivers, such as display drivers, touchscreen drivers, audio drivers, camera drivers, microphone drivers, Wi-Fi drivers, Bluetooth drivers, NFC drivers, and/or other drivers. A hardware abstract layer may be provided. In addition a variety of libraries may be provided. The kiosk may host a plurality of applications, such as one or more of the following: a browser, a VOIP application, a texting application, a payment processing application (e.g., an NFC pay application, a Bitcoin pay application, a magnetic card swipe application, etc.), a mapping application, and/or a services request application.

A home screen user interface may include a plurality of icons which may be used by a user to access a corresponding hosted application. For example, the home user interface (which may also be referred to as a kiosk desktop or home page), may include icons corresponding to a browser, a VOIP application, a texting application, a mapping application, one or more services request applications, other applications discussed herein, and/or other application.

A single services request application may be configured to provide interfaces for requesting different types of service (e.g., a lawyer, a bail bondsman, a medical service provider, etc.), or different applications may be provided to request different types of services. For example, if a single services request application is configured to provide interfaces for requesting different types of services, upon a user activating the services request application, the services request application may present a menu of types of services available for request. The menu may be in the form of icons, text, a drop down menu, or other type of menu.

For illustrative purposes as to how the systems and processes herein may optionally be utilized, an example user interface for a bail bondman will now be described. The user interface may include fields configured to receive some or all of the following information (e.g., via textual keyboard entry and/or voice entry): user identification and contact information (e.g., name, phone number, email address, physical address, etc.) identification and contact information for the person needing bail (where a control may be provided that enables the user to indicate that it is the user that needs the bail), the amount of bail, when the bail is needed by, the court that set the bail, the crime the person needing bail (the "client") is charged with, the name and/or address facility/jail the client is being held, the client's previous criminal arrests and convictions, the number of times the client has previously obtained bail from a bail bondsman, whether the client has ever forfeited bail, who is going to pay the bail bondsman fee (e.g., 8%, 10%, or other percent of the bail amount), whether the fee to be paid to the bail bondsman will be in currency or other collateral (e.g., automobiles, real estate, stocks, bonds, jewelry, personal credit, bank accounts, etc.), and/or other information.

Some or all of the information may be made available/transmitted to one or more bail bondman systems (e.g., associated with bail bondsman that have agreed to accept bail requests) via a Web service, a JSON file, a simple text files, an intermediary cloud-based system that receives the information from the kiosk, or otherwise. For example, personally identifying information for the client and/or user may be withheld and/or encrypted to protect the client's/user's privacy at least until the client/user has agreed to accept an offer from a bail bondsman. A given bail bondsman (or bondsman system) may analyze the received user/client information and decide to offer to provide the requested bail amount. The offer may be transmitted to the user/client. If the user/client decides to enter into an arraignment with the bail bondsman, the user/client activates an accept/proceed control. The user/client activation of the control may be received and stored in memory. The kiosk may print out via a printer a bail bond agreement that is in compliance with government regulations and/or has been approved by a government entity.

Government regulations may require that the user/client sign the agreement. The user may complete the agreement (e.g., using a pen or pencil) and execute/sign the agreement, and send the completed agreement to the bail bondsman. For example, the user may place the executed agreement in front of the kiosk camera, activate a shutter control, and the kiosk camera will capture an image of the executed agreement and forward it to the bail bondsman system (e.g., directly or via an intermediary system) as a digital file (e.g., a JPEG file, a TIFF file, a PNG file, a PDF file, or other file type). If the kiosk is equipped with a fax, the user may fax the agreement to the bail bondsman. A payment instrument form may be provided via a user interface enabling the user to specify a payment medium (e.g., credit card, debit card, Bitcoin, etc.). The kiosk may generate and print and/or email a receipt for the payment. The foregoing process may similarly be used for other types of service providers (e.g., lawyers, doctors, etc.).

Example aspects will now be described with reference to the figures.

As illustrated in FIG. 1, an example kiosk 102 may include one or more displays 108, 110 positioned at a relatively high level (e.g., having a lower edge at least 4 feet from ground level) on a body 114 of the kiosk (where the body may include a post or tower portion) so as to be viewable by passerby's. Displays 108, 110 may be relatively large (e.g., in the range of 32 inches-102 inches diagonal, 40 inches diagonal, 50 inches diagonal, 55 inches diagonal, 60 inches diagonal, 70 inches diagonal, 80 inches diagonal, 90 inches diagonal, or larger). The displays 108, 110 may be weather sealed (e.g., using an O-ring or other sealing technique) so as to withstand rain, snow, sleet, and/or freezing temperatures. The displays 108, 110 may be equipped with sunlight readable, anti-glare displays, and may be equipped with heaters. The displays 108, 110 may optionally be high definition (e.g. 1920×1080), 4K ultra-high definition (e.g., 3840×2160), 8K ultra-high definition (e.g., 7680×4320), or other resolution. The displays 108, 110 may be affixed to the kiosk body 114 via bolts, brackets, or otherwise. One or more of the displays 108, 110 may be built into or recessed into the kiosk body 114 to better protect the displays from weather and/or vandalism. Optionally, the actual display portion of the displays 108, 110 may be non-touch in the sense that the display portions are not configured to receive user touch instructions (although one or more touch controls may be provided on a display bezel or rear).

The kiosk 102 may be equipped with one or more internal and/or external antennas 112 (e.g., passive or active Wi-Fi antennas, cellular antennas, satellite antenna, and/or other antennas). The antennas may be mounted directly or indirectly to the kiosk body 114. The kiosk 102 may include a router that connects to the Internet via a wired and/or a wireless connection to an Internet Service Provider. The kiosk 102 may act as a Wi-Fi hotspot, optionally providing gigabit or higher Wi-Fi connections to Wi-Fi equipped devices. Optionally, the kiosk provides end-to-end encryption using HTTPS or SSH.

The kiosk 102 may be equipped with one or more terminals 104, 106, including user input devices. For example, a given terminal may include one or more touch screens configured to display user interfaces and receive user inputs via touch (e.g., via finger touch, stylus touch, etc.). The terminal may host a browser that provides access to remote networked resources. The user interfaces may include icons, tiles, links, text, videos, photos, telephone style keyboard, computer style keyboard, emergency call controls (e.g., a 911 button to place a call for police, ambulance, and/or fire department), or any combination thereof. The terminal may also be configured with a microphone and speaker. The terminal may implement a VoIP phone or a cellular phone using the speaker and microphone to enable a user to place and receive phone calls. The microphone and speaker may also be used to provide a voice command and response system. The microphone may be used to provide data entry for user interface fields, where a speech recognition system provided by the kiosk or a remote system converts the user's speech to text, and enters the text into a corresponding field for display to and approval by the user and for submission to the remote system. The terminal may also be equipped with a camera. The camera may be utilized for video calls or to capture images (e.g., photographic images), such as images of documents and/or users. The camera may also be utilized by the kiosk to receive user commands via gestures (e.g., hand and finger gestures). The camera may also be utilized in combination with a facial recognition system to recognize and authenticate a user. In addition, the terminal may include a printer (e.g., a laser printer, a thermal printer, an inkjet printer or other printer type), which may be used to print documents, such as maps, receipts, and/or other documents. The terminal may include a dedicated scanner (e.g., a fax scanner coupled to a fax machine) in addition to a camera. The terminals 108, 110, may include physical input controls, such as keyboards, call buttons, volume control buttons or knobs, and/or other physical controls.

Optionally, the terminals 104, 106 may include displays (e.g., touch screens) that are smaller than and/or positioned lower than the displays 108, 110. For example, the displays may be in the range of 10 inches-50 inches diagonal, although other sizes may be used. The terminal displays may be weather proofed/sealed as similarly discussed above with respect to displays 108, 110. The displays and controls of the terminals 104, 106 may be positioned at the same height but on different sides of the kiosk 102, or one terminal may be positioned so as to be accessible to someone in a wheelchair, and another terminal may be positioned relatively higher so as to be comfortably accessible by someone standing. Optionally, the terminals 104, 106 may be on rails or pivotable to enable a user to adjust the terminal height. Optionally, the kiosk 102 may be transportable. Optionally, the kiosk 102 may include two or more wheels to enable the kiosk 102 to be more easily moved/rolled and transported. Optionally, the kiosk 102 may include base brackets and may be bolted to a surface (e.g., a sidewalk). Optionally, the kiosk 102 may include a broad base 116 (e.g., a circular or polygon base) to provide stability.

Figure 2:
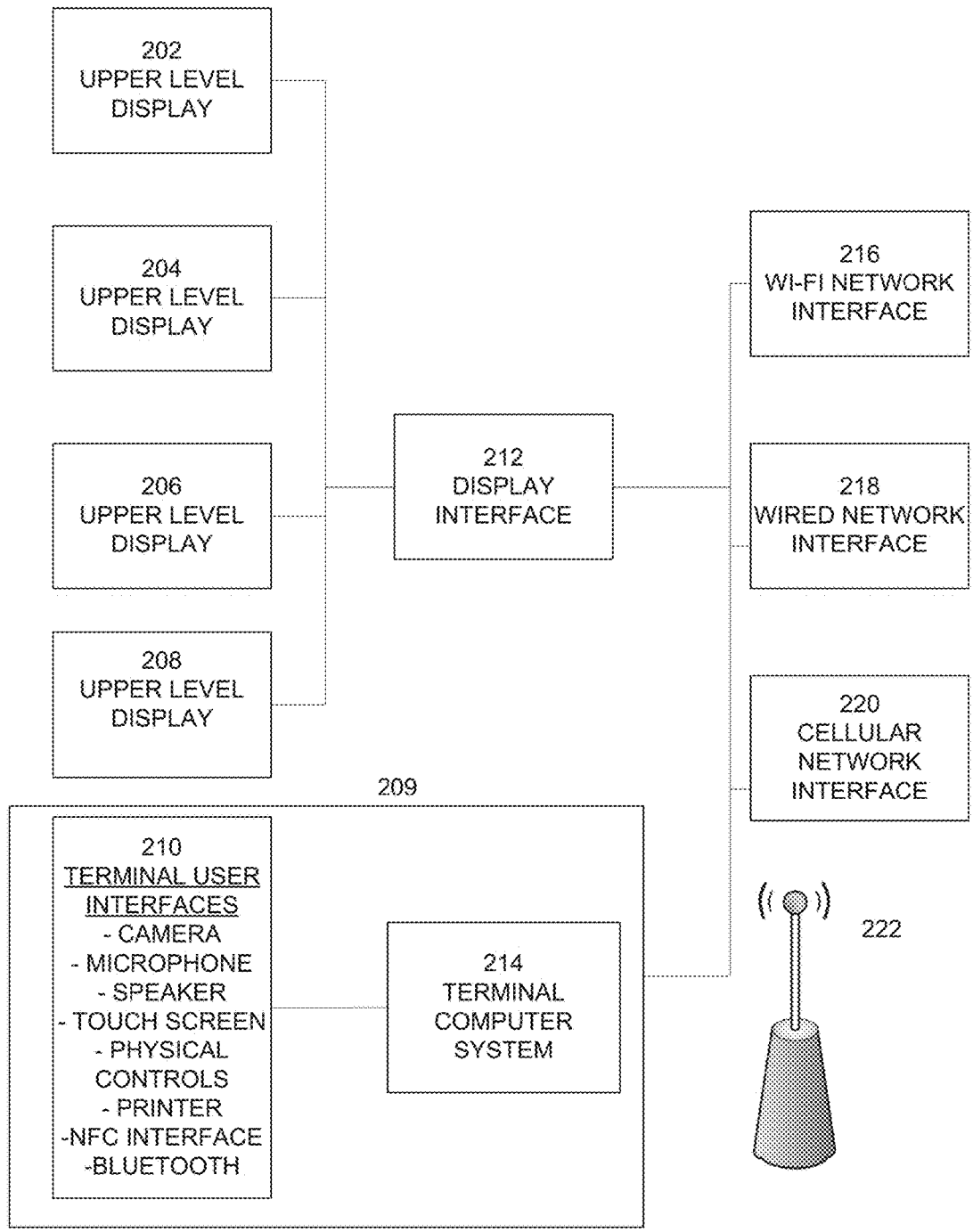
FIG. 2 illustrates example architecture.

FIG. 2 illustrates an example kiosk architecture. In this example, the kiosk includes four upper level displays 202, 204, 206, 208, although fewer or additional upper level displays. As discussed above, the upper level displays may be weatherproofed and sunlight readable. The upper level displays 202, 204, 206, 208 may be controlled by one or more display controllers 212.

In addition, a user terminal 209 may be provided. The user terminal 209 may include user input/output interfaces, such as one or more cameras, microphones, speakers, touch-screens, physical controls (e.g., volume control, keyboards, keypads, call buttons, etc.), printers, near field communication (NFC) interfaces (e.g., having a range in the range of 0.25 inches and 32 inches, and optionally using secret key authentication), Bluetooth interfaces, printers, and/or other interfaces. The terminal 209 may further include a computer system 214 comprising a processing device, volatile memory, non-volatile memory, programs, power management circuits, a touch screen controller, etc.

The kiosk may include various network interfaces. For example, the kiosk may include some or all of the following: a Wi-Fi network interface 216, a wired network interface 218, and/or a cellular network interface 220. One or more of the wireless network interfaces may be connected to one or more antennas 222. Optionally, the wired network interface 218 and/or the wireless cellular network interface 220 may provide a high speed wire connection to an ISP provider for Internet access. The Wi-Fi network interface 216 may provide hotspot access to the Internet for one or more Wi-Fi-equipped user devices (e.g., mobile phones, tablets, laptops, wearables, automotive vehicles, etc.). The kiosk may be optionally further equipped with a GPS receiver or other geolocation system which may be used to determine the kiosk's location. Optionally, the kiosk's location may be programmed into and stored in non-volatile kiosk memory.

Figure 3:
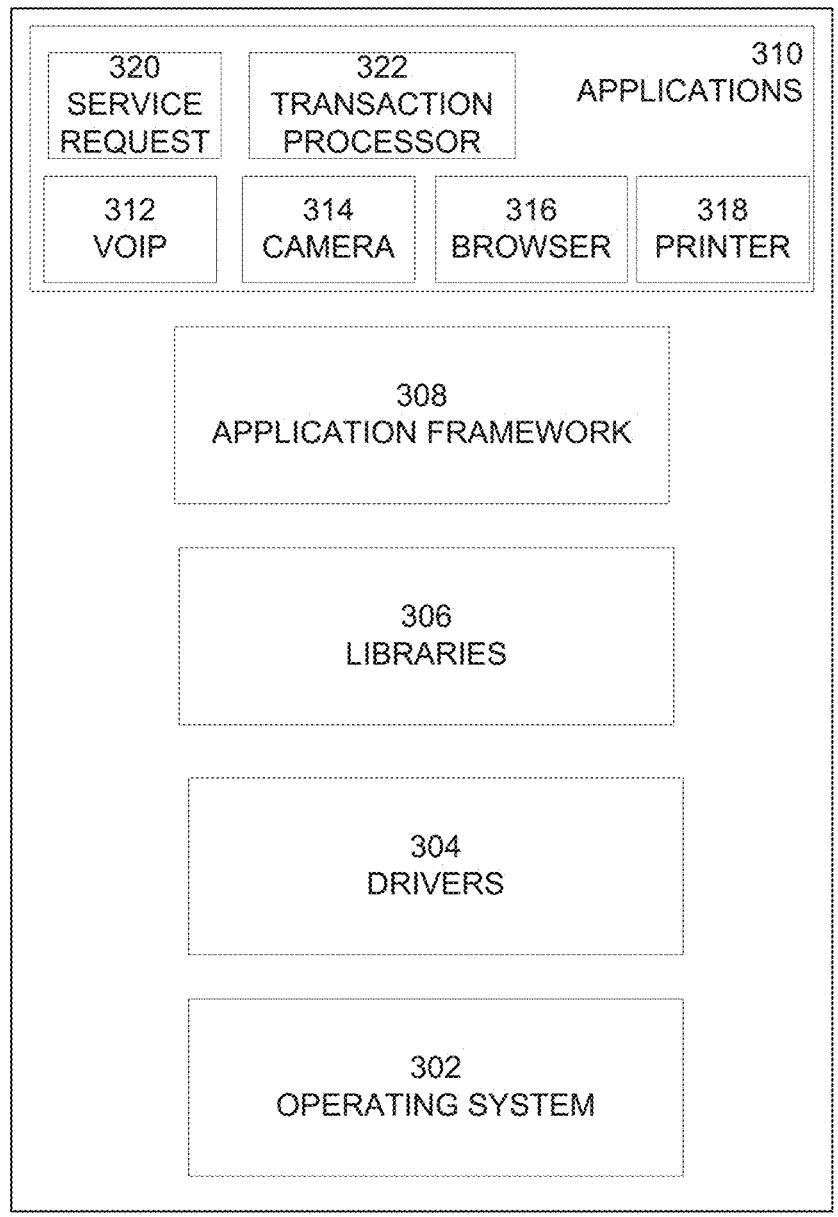
FIG. 3 illustrates an example software architecture.

FIG. 3 illustrates an example software architecture for a terminal computer system, such as terminal computer 214 of the kiosk illustrated in FIG. 2. The software architecture may include an operating system 302 (e.g., GOOGLE ANDROID, APPLE iOS, MICROSOFT WINDOWS, APPLE OS, UNIX, LINUX, etc.), drivers 304 (e.g., display, camera, microphone, keyboard, Wi-Fi, memory, etc.), libraries 306 (e.g., SSL, Webkit, SQL, etc.), an application framework 308, and applications 310. For example, the applications 310 may include a VoIP application 312, a camera application 314, a browser application 316, a printer application 318, a service request application 320, a transaction process application 322, and/or other applications. The applications 310 may include "apps" that are also generally available to users via an app store for download to mobile phones, tablets, laptops, desktop computers, automobiles, televisions, set top boxes, etc.

Figure 4:
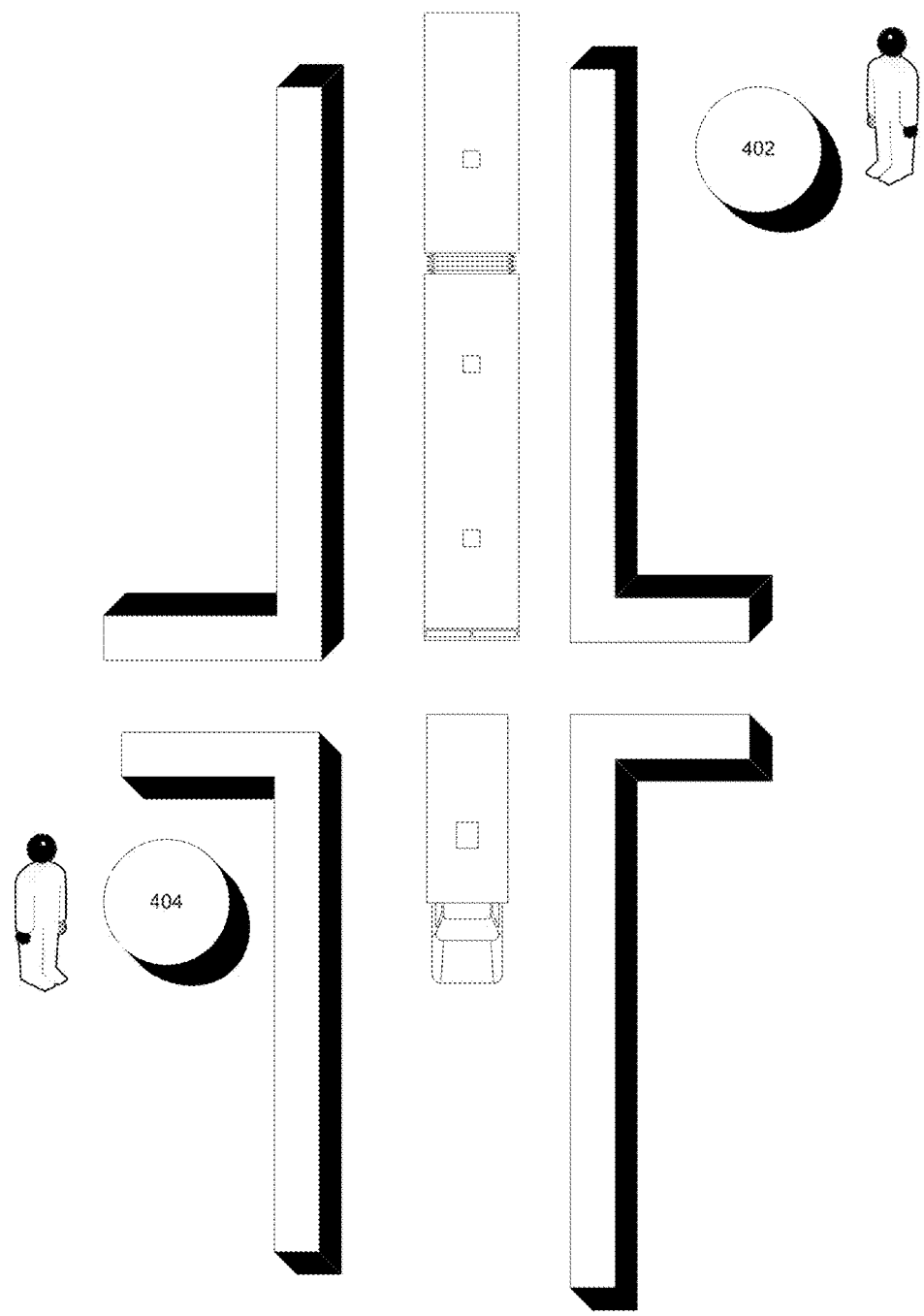
FIG. 4 illustrates an example kiosk placement.

FIG. 4 illustrates a plurality of terminals 402, 404 at different geographical locations. As similarly discussed elsewhere herein, the upper displays of terminals 402, 404 may display the same or different content.

Figure 5:
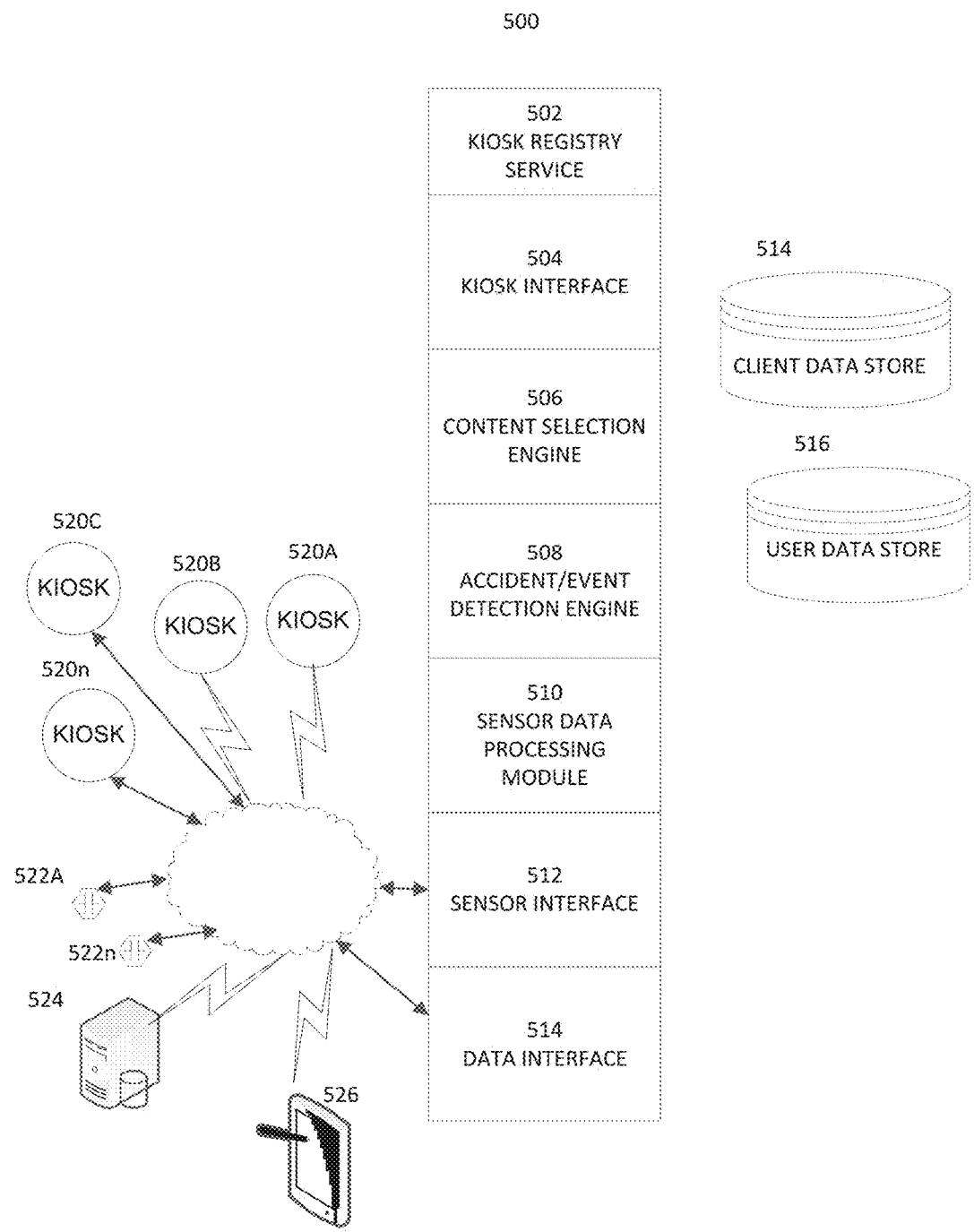
FIG. 5 illustrates an example system architecture.

FIG. 5 illustrates an example architecture including multiple kiosks (520A-520n) connected via a wireless or wired network to a remote system 500 (e.g., a cloud-based system). The system 500 may be configured to control what content is displayed on the kiosk displays, when the content is displayed on kiosks displays, and/or for how long content is displayed on kiosk displays, as described elsewhere herein. In addition, the remote system 500 may be configured to receive user input from the kiosk (and/or from user terminals, such as mobile phones, tablets, or laptop computers), act on the user input, and cause a response to be presented to the user via kiosk displays, speakers, or otherwise, as similarly described elsewhere herein.

The remote system 500 may include a kiosk registry service 502 that enables the kiosks to be registered with the remote system 500. For example, the kiosk registry service 502 may receive for a given kiosk a unique kiosk identifier, location information associated with the kiosk (e.g., in the form of street name(s), addresses, latitude and longitude, map grid identifier, or otherwise), kiosk equipment information (e.g., the number of kiosk upper level displays; the number of kiosk lower level displays; the display sizes; whether the kiosk is equipped with a camera, microphone, printer, fax, speaker; the installed applications, the type of Wi-Fi router; the Wi-Fi network interface speed; the types of personal network interfaces the kiosk is equipped with; the types of near field communication interfaces the kiosk is equipped with, etc.).

The kiosk interface 504 may be used to provide instructions, requests, content, and/or programs to the kiosks, and to receive requests, instructions, and/or content, from the kiosks. For example, the kiosk interface 504 may be used to transmit content, or a pointer to content, over a network to the kiosks for display on one or more kiosk displays. By way of further example, the kiosk interface 504 may be used to receive data provided by a user via one or more user interfaces of the kiosk. The data may be textual data, images captured via a kiosk camera, faxes of user documents received via a kiosk fax device, voice captured via a kiosk microphone, etc.

A content selection engine 506, may be used to select content for display on one or more kiosk displays based on a scheduling program and/or on real-time events, such as a determination by the accident/event detection engine 508 that an accident has occurred at a certain location, a police action has occurred at a certain location, there is a certain amount of vehicle or pedestrian traffic at a certain location, etc. The content selection engine 506 may be configured to determine what content is displayed on the kiosk displays, when the content is displayed on kiosks displays, and/or for how long content is displayed on kiosk displays.

Event information may be received by the accident/event detection engine 508 from one or more sensors 522A-522n (which may be sensors included in one or more kiosks, automobiles, street lights, dedicated cameras, etc.) and/or from one or more data stores 524, accident broadcast services, traffic services, navigation services, etc. For example, the sensors may be configured to detect accidents, such as car accidents. The sensors may comprise a microphone associated with a signal processing which can detect sounds and determine if the sounds correspond to an impact involving a motor vehicle (e.g., identify the sound of a sudden impact and/or bending or tearing metal such as would occur in a crash). The sensors may comprise a camera and an associated processing system that can visually identify accidents, police operations, etc.

The sensor data may have been received via the sensor interface 512, and the sensor data may have been processed via the sensor data processing module 510, which may normalize the sensor data, filter the sensor data, scale the sensor data, etc. The system 500 may receive data from the data stores 524, accident broadcast services, traffic services, navigation services, etc. via the data interface 514. The data interface may also be used to receive and transmit data to a user terminal 526, which may have a dedicated application or a web browser installed thereon providing user access to the various user interfaces and content described herein. The user terminal 526 may include user input/output interfaces, such as some or all of the following: cameras (e.g., to capture images of people, accidents, documents, etc.), microphones (e.g., which may be used to capture witness statements and/or other statements), speakers, touchscreens, physical controls (e.g., volume control, keyboards, keypads, call buttons, etc.), printers, near field communication (NFC) interfaces, cellular interfaces, Wi-Fi interfaces, network and/or prephrial interface antennas (e.g., for the cellar, Wi-Fi, and/or Bluetooth interfaces), fingerprint sensors, other biometric sensors, and/or other interfaces. The user interfaces presented via the user terminal 526 may be used to provide information and instructions to the system 500 as similarly discussed herein with respect to the kiosks.

A client data store 514 may be used to store information regarding service providers offering their services to users via the kiosks and/or system 500. The information may include a userID, a password, a client personal name, business name, specialty (e.g., lawyer, doctor, dentist, bail bonds person, etc.), sub-specialty (e.g., for a lawyer: an immigration lawyer, a personal injury lawyer, a workman compensation lawyer, a divorce lawyer, a landlord-tenant lawyer, a tax lawyer, etc.; for a doctor: an orthopedist, a surgeon, a family doctor, a psychiatrist, a psychologist, etc.), professional license number, when the service provider was first licensed, contact information (e.g., physical address, email address, telephone number, SMS address, Skype® address, etc.), payment information (e.g., credit card number or other identifier for a payment source), and/or other information received via the example user interfaces described herein. The client data store 514 may also store current and/or historical information on transactions conducted using the system 500 and/or kiosks, including the identities of the users to who they provided services, the amounts the clients paid to the system operator, the amount the clients received from users for services arranged using the system 500 and/or kiosks, etc.

A user data store 516 may be used to store information regarding users of the system 500 and/or kiosks, such as users seeking services from service providers. The information may include a user name, a userID, a password, contact information (e.g., physical address, email address, telephone number, SMS address, Skype® address, etc.) and/or other information received via the example user interfaces described herein. The client data store 516 may also store current and/or historical information on transactions conducted by the user using the system 500 and/or kiosks, including the identities of the service providers the user has used, which kiosks or user terminals the user used to provide information, etc.

Figure 6:
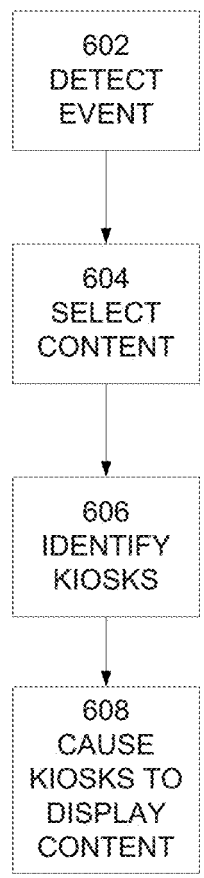
FIGS. 6, 7, and 8 illustrate example processes.

FIG. 6 illustrates an example process which, for example, may optionally be carried out in whole or in part by the system 500 and/or one or more kiosks. At block 602, an event is detected. The event may be an accident, police activity, other non-predicted event, and/or a scheduled event. The event may be detected via one or more sensors (e.g., a sound sensor, a vibration sensors, a camera) or from information received from one or more data stores or services (e.g., accident broadcast services, traffic services, navigation services, policy activity reporting services, etc.). The event may also be detected based on a user input via a kiosk or a user terminal (e.g., via an application or a general purpose browser). At block 604 content is selected for display on one or more kiosks. For example, the content may be selected for display on an upper level kiosk display and/or on a lower level kiosk display (e.g., notification information, user interfaces, etc.). At block 606, the process identifies one or more kiosks that are to display the content (e.g., one or more kiosks within a geographic area of where the event occurred). At block 606, the process causes the kiosks to display the selected content. The content may have been stored on the kiosks, streamed or downloaded from the system 500, or streamed or downloaded from another source (e.g., a remote content server).

Figure 7:
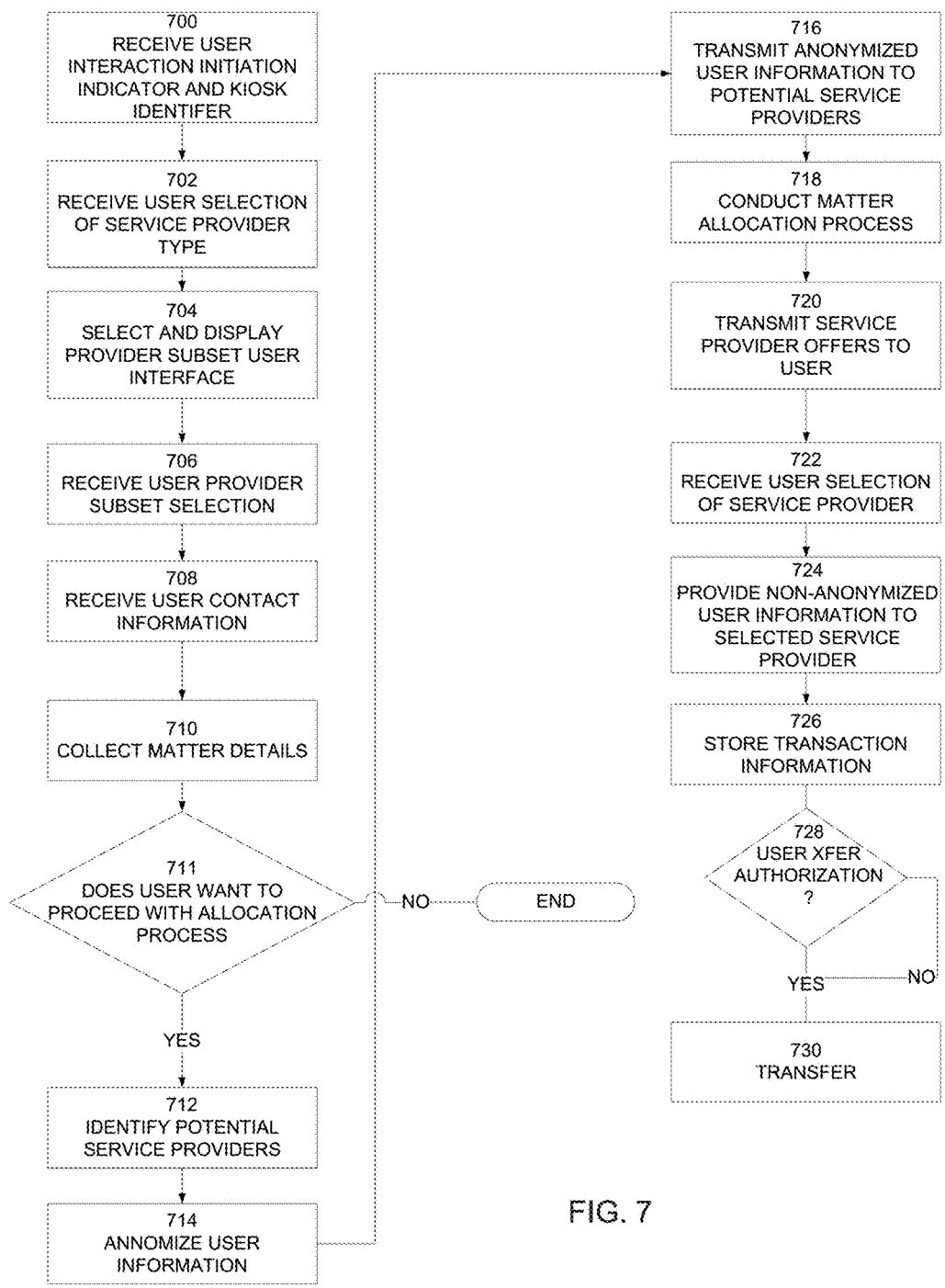

FIG. 7 illustrates an example process of an interaction with a user via a kiosk (although the process, as well as other processes described herein, may be executed with respect to a user accessing the services and user interfaces via a dedicated application (sometimes referred to as an "app") or a browser hosted by a user terminal that accesses a website hosted by a remote system rather than or in addition to the kiosk; optionally the user terminal may access various user interfaces by accesses the Wi-Fi network provided by a kiosk). At block 700, the process detects that a user is interacting with a kiosk. For example, the user may access a user interface presented via the kiosk (e.g., a user touch of a kiosk touchscreen or physical button). The kiosk may detect the user input. The kiosk may transmit the user input to a remote system, such as system 500. The kiosk may also transmit a unique kiosk identifier associated with the kiosk, and optionally geolocation information (e.g., in the form of street name(s), addresses, GPS signal information, latitude and longitude, map grid identifier, or otherwise).

At block 702, a user interface is provided via which the user can select a service provider type selection and/or indicate a matter type. The kiosk may receive the user selection. The kiosk may optionally transmit the selection to the remote system. For example, the user interface may enable a selection of a matter type from the set of car accident, immigration, criminal, landlord-tenant, etc. By way of further example, the user interface may enable a selection of an attorney, a medical service provider, or a bail-bonds persons, and the user may have selected a given service provider type. The user selection of the matter type or service provider type may be received. The kiosk may receive the user selection and may optionally transmit the selection to the remote system.

At block 704, optionally a user interface is selected and provided for display by the kiosk via which the user may select a service provider subtype. For example, if the user had selected a lawyer as the service provider type at block 702, than the selected sub-type user interface may, by way of example, list: immigration lawyer, personal injury lawyer, workman compensation lawyer, divorce lawyer, landlord-tenant lawyer, a tax lawyer, etc. At block 706, the kiosk may receive the user selection of a sub-type. The kiosk may optionally transmit the sub-type selection to the remote system.

At block 708, the process may prompt the user to provide contact information. For example, a user interface may be provided that includes fields for some or all of the following: name, mobile phone number, home phone number, work phone number, email address, Skype address, physical address, etc. The kiosk may receive the user contact information. The kiosk may optionally transmit the contact information to the remote system.

At block 710, matter details are requested and received from the user. For example, user interfaces may be provided with fields relevant to the matter-type or service provider type previously selected by the user. A given user interface may include one or more pages of fields. The kiosk may receive the user provided information and may optionally transmit the user provided information to the remote system. The information may include photographs or scans of documents and/or document optical codes (e.g., 1D or 2D barcodes (e.g., QR codes)).

By way of illustration, if the matter-type is a car accident, the process may select and present via the kiosk a user interface with fields (e.g., text fields, checkbox fields, menu selections, etc.) configured to receive some or all of the following information: when did the accident occur, where did the accident occur, was the user the driver, was anyone injured, how many people were injured, how many people in the user's vehicle were injured, how many people in other vehicles involved in the accident were injured, what were the injuries (e.g., cuts, abrasions, broken bones, concussion, whiplash, etc.) of people in the user's vehicle, what were the injuries of people in the other vehicles, etc. The user interface may also prompt the user to record (e.g., a video, voice, or text recording) statements from third party witnesses, capture and upload photographs and/or videos of the accident (e.g., the damaged vehicles and people involved in the accident), provide (e.g., as photograph or PDF file via email or an upload) a police report, and provide insurance information (e.g., insurance provider and insurance number, a photograph of an insurance card, etc.) for each driver or vehicle owner involved in the accident. The user interface may also prompt the user to provide additional information regarding the user, such as the user age (e.g., the exact age, or an indication that the user is over 18), and/or whether the user is a citizen, a lawful resident, and/or a lawful visitor of the country where the accident occurred.

By way of additional illustration, if the matter-type is a criminal matter, the process may select and present via the kiosk a user interface prompting the user to scan and upload a criminal complaint and affidavits filed with the criminal complaint. A user interface may be provided with fields configured to receive some or all of the following information: an indication as to whether the user has already made a court appearance, whether the user has posted bail and if so how much bail, whether there is a warrant out for the user's arrest, whether the user is already represented (e.g., by a public defender, a private lawyer, or is not represented), the number of felonies the user has previously been convicted of, the number of misdemeanors the user has previously been convicted of, etc. The user interface may further prompt the user to indicate whether a prosecutor has provided the user with other documents (in addition to the complaint) and/or whether a prosecutor has provided the user's lawyer with other documents. The user interface may also prompt the user to scan, email, or upload such documents.

By way of yet further example, if the matter-type is a divorce, the process may select and present via the kiosk a user interface with fields configured to receive some or all of the following information: the state of residence, whether the user has been a resident of the state for more than a first threshold period of time, the county of residence, whether the user has been a resident of the county for more than a second threshold period of time, how long the user has been married, whether the divorce is contested or uncontested, whether the user and the user's spouse agree to issues regarding the divorce, whether the user or the user's spouse has already filed a petition for dissolution or divorce and if so, has the petition/summons been served, whether financial disclosures have been filed with the court, etc. The user interface may further be configured with fields to receive some or all of the following information: whether the user can locate the user's spouse, whether the user and spouse are currently living together, whether the user and spouse have children below the age of 18 from the marriage, whether the user and spouse have a parenting plan in place, whether the user and spouse are serving active military duty, whether the spouse is represented by an attorney, whether the user and spouse own any real estate, whether the user and spouse have any material assets or debts, whether the user or spouse will be requesting spousal support, etc. The user interface may further prompt the user to scan, email, upload, or otherwise provide any documents served upon the user or filed with the court in the matter.

By way of still further example, if the matter-type is immigration, the process may select and present via the kiosk a user interface with fields configured to receive some or all of the following information: whether the user is at risk of deportation/removal, whether the user fears being persecuted if the user is returned to the user's home country (e.g., because of the user's race, religion, nationality, membership in a certain group, political opinion) and wants to apply for asylum, whether the user want to apply for United States legal permanent residency (e.g., a Green card) based on one or more reasons (e.g., employment, relatives in the United States, or other reasons (with a field configured to receive an explanation as to the other reasons), whether the user is marrying a U.S. citizen or legal permanent resident, whether the user is seeking employment authorization to work in the U.S. or apply for a visa based on employment (e.g., an H-1B visa) or training, whether the user wants to apply for U.S. citizenship, whether the user is attending school in the U.S. (e.g., under an F-1 visa), whether the user wants to petition on behalf of a relative for a visa or other form of residency permit, etc. It is understood that while examples provided herein may refer to the United States and certain types of visa, the user interfaces may be configured to receive similar information for other countries.

The immigration-related user interface may also be configured to receive some or all of the following information: how many appearances the user has already made in court for the matter; whether the user was previously represented by an attorney in the matter, when the user's next court date is for the matter, whether the user has been previously convicted of a crime (and if so, when was the user convicted, in what jurisdiction was the user convicted, what type of crime was the user convicted of (e.g., drug possession, burglary, assault, etc.), whether the user is married to a U.S. citizen or legal permanent resident, whether the user is a U.S. citizen or legal permanent resident and wants to marry a foreign national (a non-U.S. citizen or legal permanent resident), whether the user has a relative who is a U.S. citizen or legal permanent resident, and the dates the user has entered or exited the U.S. The user interface may further prompt the user to scan, email, upload, or otherwise provide any documents served upon the user or filed with the court in the matter.

At block 711, the process prompts the user (e.g., via a user interface provided by the kiosk) to agree to certain terms and conditions of use. The process may provide instructions and guidance to the user, and may ask the user to confirm that the user wants to proceed with enabling service providers to indicate whether they are willing to take on the user matter, and if so, under what conditions. For example, terms and conditions may describe techniques for allocating the matter to service providers (e.g., via an auction (e.g., a reverse auction)), may specify that the operator of the process is not providing a recommendation of one participating service provider over another participating service provider, may specify that the user is not obligated to agree to accept service from a given participating service provider, etc.

The user interface may also describe information that should be included in offers from service providers to provide service (e.g., a link to the service provider's website, social media page, contact information, license number (e.g., bar or medical license number), etc. The user interface may instruct or advise the user not to accept service offers that is missing certain information (e.g., a website link, a license number, etc.). The user interface may also advise the user to inspect the service provider's website and to check whether the service provider is licensed to handle the matter (e.g., via state bar website whose link may be included in the user interface).

If an auction is to be conducted enabling service providers to bid on handling the user's matter (e.g., where the bid indicates how much the service provider will charge the user to handle the user's matter), the user interface may explain that an auction will be conducted enabling service providers to bid to handle the user's matter, that the user will be provided with the identity of the service providers bidding on the user's matter, and that the user's identity will not be disclosed to the bidding service providers unless the user accepts a bid from a service, at which point the user's identity (and optionally contact information) will be provided the service provider whose bid the user accepted.

The user interface may also indicate that the auction will last for a specified period of time (e.g., 30 minutes, 60 minutes, 4 hours, 12 hours, 24 hours, 48 hours, etc.), that whenever a service provider bids on the matter, information on the bid will be transmitted (e.g., via email or text message or displayed via a dedicated application on the user's terminal) to the user (e.g., in substantially real time), optionally to a destination specified by the user (e.g., an email address and/or a text message address (e.g., a mobile device phone number)). The user interface may further inform the user that after the bidding starts, the user may accept a bid at any time and stop the auction process, may stop the auction process without accepting a bid, or may continue to review bids until the end of the auction and then decide to accept a bid or to refuse all bids. The user interface may further inform the user that if the user accepts a bid, the user will need to post funds (e.g., in an escrow account) to cover the bid amount or a portion thereof.

Optionally, the user interface may also include a preference user interface via which the user can specify certain service provider characteristics that the user prefers or requires. For example, the user interface may enable the user to specify a numbers of years of experience a service provider should have (e.g., how many years the service provider has been licensed to provide the service), how large the service provider should be (e.g., for a law firm, at least 3 lawyers, at least 10 lawyers, etc.), and/or a specific service provider geographical area (e.g., a specified zip code, or within a specific range of a specified address or zip code).

A field may be provided via which the user can accept the terms and conditions, and indicate that the user wants to proceed with the process of retaining a service provider (e.g., via an auction). At block 711, the process may determine from the user's input (or lack thereof for a specified period of time), whether user wants to proceed with the process of retaining a service provider, where the matter will be allocated to a service provider that the user agrees to. If the user elects not to proceed (e.g., by selecting a decline to proceed control, by closing a webpage or application displaying the user interface, or otherwise), the process may end. If a determination is made that the user wants to proceed, the process may proceed to block 712.

At block 712, the process may identify service providers that are suitable for the user's matter. For example, service providers may have established accounts via a system (e.g., system 500 illustrated in FIG. 5). A description of an example account setup and access process will now be described.

The account information may have been obtained from a given service provider via a user interface provided for display on a service provider terminal via a webpage, a dedicated application, or otherwise. The user interface for collecting information from a lawyer may include fields to receive some or all of the following information: name of lawyer, nickname/userID, license number, name of law firm, law firm address (e.g., street address, state, country, zip code), email address, mobile phone number, landline phone number, specialty (e.g., one or more of immigration, personal injury, workman compensation, divorce/matrimonial, landlord-tenant, tax lawyer), payment information (e.g., credit card number, a bank account number, PayPal account information, or other payment instrument identifier), and/or account information to which user payments are to be made (e.g., a bank account number, a PayPal account information, etc.). The account information may also include or be linked to ratings provided by users for the service provider. For example, the ratings may include a number rating (e.g., 1-5, or 1-5 stars), a letter rating (e.g., A-F), and/or a comment rating. The account information may be stored in a database, such as a relational database, a self-referential database, a graph database, or otherwise. Optionally, the stored data is encrypted (e.g., using transparent data encryption to encrypt the entire database, column-level encryption where columns are selectively encrypted using a column-specific key, field level encryption, etc.), using, for example, symmetric or asymmetric encryption.

To ensure the reliability of the information provided by the service provider, optionally some or all of the information provided by the service provider is confirmed with a professional association or government entity that licenses practitioners in the service provider's field. For example, if the service provider is a lawyer, using the license number and/or name provided by the service provider to identify corresponding records, some or all of the information may be corroborated using data accessed from a database of the bar association of the state that the service provider claims he or she is licensed in. To further validate the information provided by the service provider, in order for the service provider to activate an account, a communication (e.g., an email, text message, or letter with a link and/or password) is transmitted to a corresponding address accessed from the professional association or government entity database (rather than the address provided by the service provider), and the service provider needs to successfully activate the link and/or enter the password via a login page. The service provider may login to access, view, and/or edit account information. The account information may include auction bid histories (as described elsewhere herein).

Advantageously, the storage of service provider information using a graph database (rather than as a table or rows and columns) provides index-free adjacency, where a given element in the database contains a direct link to its adjacent element and index lookups are not required. In a graph database, a given element/node knows what node or nodes it is connected with. A graph database utilizes graph theory to very rapidly examine the connections and interconnectedness of nodes. When performing a search using a graph database, results in associative data sets (where information is the aggregation of links between nodes) may be identified much faster than when performing a search using a relational database. Optionally, a database may be a hybrid of a relational database and a graph database.

The process may utilize the user selection of a matter-type or service provider-type, and user preferences (e.g., regarding the experience, size, and/or location of the service provider) if any, in a database query to locate service providers that match the query.

At block 714, the user information that will be provided to the service providers may be anonymized. For example, a random pseudonym may be assigned to the user which may enable the user to keep the user's identity hidden with respect to requests for service. Further, the process may inhibit the inclusion of other information (e.g., contact information) that may be used to personally identify the user in the request for service provided to the identified service providers.

At block 716, a communication including the anonymized user information (or link to such information) may be transmitted (e.g., via an email, text/SMS message, MMS message, other short message, dedicated application, or otherwise) to the identified service providers in conjunction with a control (e.g., a link) enabling the recipient service providers to indicate that they want to offer to services to the user. Optionally, the anonymized user information (or link to such information) is only transmitted to a service provider in response to detecting that the services provider has activated an interest indication control (e.g., a link) in a communication related to the matter.

For example, if an auction is to be conducted, the control may be a link to a bidding user interface. The bidding user interface may include some or all of the matter information provided by the user, a cost for submitting a bid (e.g., a fixed dollar amount or a percentage of the bid amount) and/or a cost if the bid is accepted (e.g., a fixed dollar amount or a percentage of the accepted bid amount). The bidding user interface may show the current, real time status of the bidding process optionally including some or all of the following: the number of bids, identities of the other bidders (e.g., userIDs or pseudonyms), ratings provided by users for the other bidders, ratings previously provided by service providers regarding the user (e.g., a number rating, a letter rating (e.g., A-F), and/or a comment rating), the current lowest bid (the lowest amount being asked to provide the requested service), the time remaining in the auction, a countdown clock indicating how long the service provider has to provide a bid (e.g., a specified or dynamically determined period of time since the last bid was received), and/or the like.

The bid may be in the form of a contingency percentage or amount. For example, a service provider bid may indicate the percentage of any damages collected for the user that the service provider will retain. By way of illustration, the maximum retained percentage may be set by statute or code, and the service provider bid may not bid to retain more than the maximum retained percentage (e.g., 30%, 33%, 40%, 50%) of any recovery (where optionally any costs of the service provider in obtaining the recovery may be retained in addition to the contingency percentage). Service providers may compete with each other by submitting lower and lower retained percentage bids.

At block 718, a matter allocation process may be conducted. For example, the matter allocation process may be performed using an auction and received bids as described elsewhere herein in greater detail. Optionally, instead, the allocation process may be performed in a round-robin manner, where matters are assigned to service providers in a circular order, where the process determines which of the identified service providers is the most distant, in terms of time, with respect to receiving a pervious matter via the system 500. Optionally, instead, the allocation process may be performed using a queue, where service providers may submit requests to provide service, and the service provider at the head of the queue is assigned the matter.

At block 720, the offers from the service providers may be transmitted to the user in substantially real time. For example, if the allocation process is via an auction, the offer may include the bid amount (or percentage), a link to the service provider's website, service provider contact information (e.g., phone number, physical address, email address, etc.), user ratings of the service provider, and/or other service provider information discussed herein. At block 722, the process receives a user selection of an offer from one of the service providers. Optionally, the user is requested to transfer an amount to a specified account (e.g., an escrow account) to cover a portion of or all of the accepted bid.

At block 724, a notification is transmitted to the selected service provider indicating that the service provider has been selected to provide the user service. The notification may include non-anonymized user information, such as the user's name and/or contact information. At block 726, information regarding the transaction may be stored in association with the service provider's and/or the user's account. The information may include the identity of the service provider, the identity of the user, the date of the user's selection of the service provider, the date the user requested a service provider, the amount of the accepted service provider's bid, the amount of user funds placed in escrow, an identification of the escrow account, etc.

At block 728, the process monitors user inputs to detect whether the user has authorized transfer of the escrowed funds to the service provider. For example, such authorization may be provided after the service provider has satisfactorily provided the requested service to the user. If the user has provided such authorization, at block 730, the funds may be transferred from the escrow fund to an account specified by the service provider in the service provider's account information. A notification may be automatically transmitted to the service provider and/or the user regarding the transfer, including the transfer amount and date of transfer.

Figure 8:
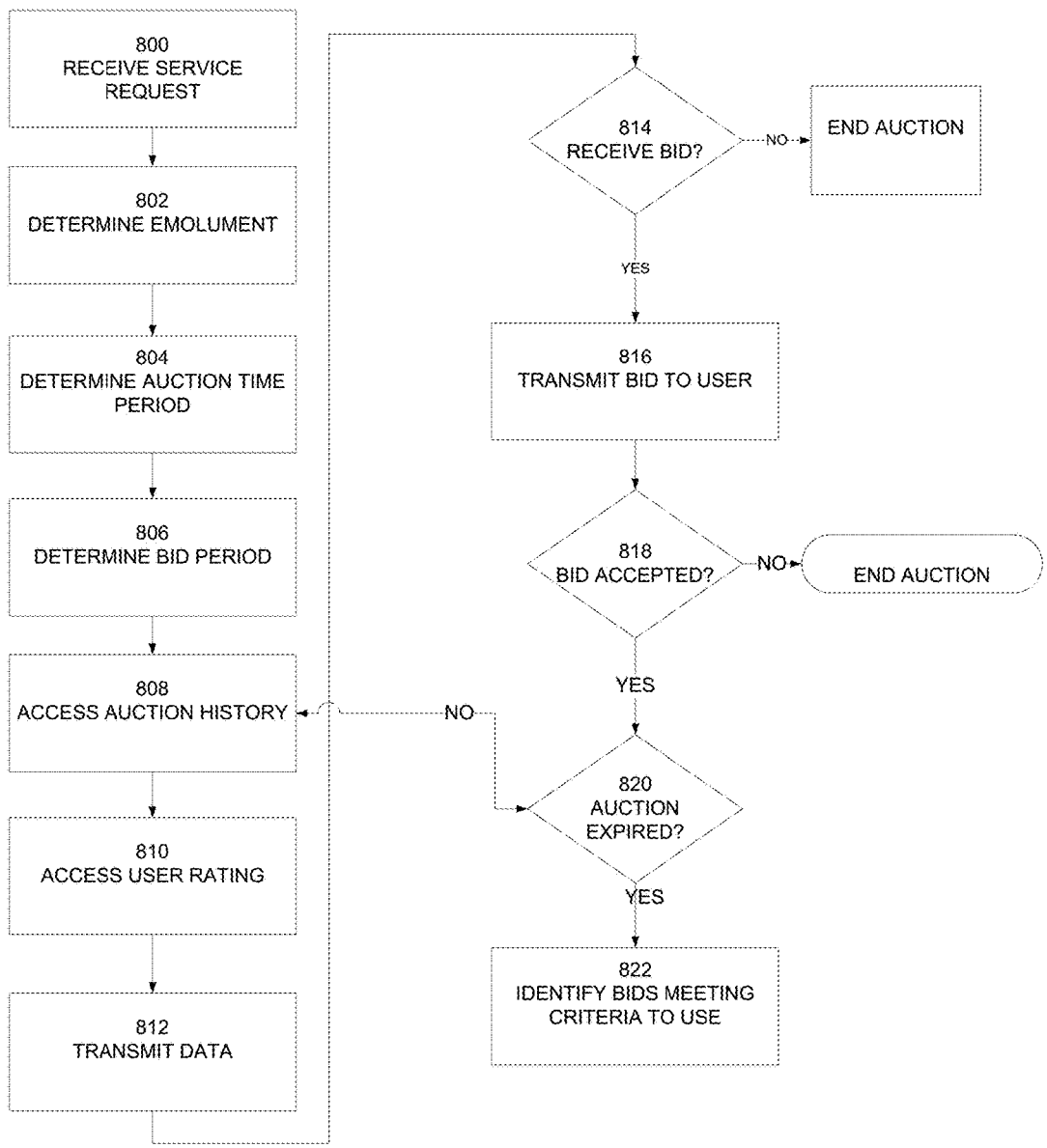

FIG. 8 illustrates an example auction process (a reverse auction process) that may be used in conjunction with the example process illustrated in FIG. 7 (e.g., block 718) or otherwise. The auction process may be executed by a system in communication with a terminal (e.g., via a dedicated application or a browser accessing an auction website) and/or a kiosk. The interfaces and communications from the system may likewise be provided to or via a terminal and/or a kiosk. The auction may be transacted in a secure manner.

For example, if the auction is being conducted via a website, in response to a webpage request from the terminal browser, the remote system (e.g., a web server) may optionally transmit its public key and certificate to a device participating in the auction (e.g., a kiosk, a user terminal, a service provider system, etc.) that hosts a respective browser. In this optional example, the browser determines whether checks that the certificate was issued by a trusted certificate authority, whether the certificate is still valid and whether the certificate is related to the auction site. If the certificate was issued by a trusted certificate authority, is still valid, and is related to the auction site, the browser uses the public key to encrypt a random symmetric encryption key and transmits the encrypted key to the server with the encrypted URL required as well as other encrypted http data. The remote system then decrypts the symmetric encryption key using the remote system's private key and uses the symmetric key to decrypt the URL and http data. The remote system transmits the requested html document and http data encrypted with the symmetric key back to the requesting terminal. The requesting terminal browser may then decrypt the received http data and html document using the symmetric key. The requesting terminal may then display the document (e.g., the auction user interface and data).

At block 800, an indication is received that a user is requesting service via an auction process. The request may be received over a wired or wireless network via a kiosk or a user terminal. At block 802, an emolument or fee amount is determined (e.g., a fixed dollar amount or a percentage of the bid amount) for submitting a bid. The amount may have been pre-specified for the service-type or service provider-type being requested and may be accessed from memory, or the amount may be dynamically determined based on one or more categories, such as the number of service providers eligible to submit a bid, the user location, the time of time, a determined importance or severity of the matter, an estimated value of the matter, a projection as to how many service providers will be participating in the auction, and/or other criteria.

At block 804, an auction time period (e.g., 30 minutes, 60 minutes, 4 hours, 12 hours, 24 hours, 48 hours, etc.) may be determined. The time period may have been pre-specified for the service-type or service provider-type being requested and may be accessed from memory, or the auction time period may be dynamically determined based on one or more categories, such as the number of service providers eligible to submit a bid, the user location, the time of day, a determined importance or severity of the matter, an estimated value of the matter, a projection as to how many service providers will be participating in the auction, the number of auctions currently being conducted, and/or other criteria. If the time period is dynamically determined, it may be rounded or normalized (e.g., so that the time period will be an integer number of hours (e.g., 1 hour, 4 hours, etc.), days (1 day, 3 days, etc.), or other unit of time). For example, the auction time period may be set to be relatively longer at least partly in response to detecting that a large number of auctions are currently being conducted to thereby reduce peak system loading.

At block 806, a bid period may optionally be determined. The bid period is the amount of time a service provider has to submit a bid. For example, optionally if the bid period expires with no further bids being received, the auction may be ended and the lowest/best bids may be selected and provided to the user in ranked order as similarly discussed below with respect to block 820. The bid period may restart each time a bid is received, until the auction time period has expired. The bid period may have been pre-specified for the service-type or service provider-type being requested and may be accessed from memory, or the bid period may be dynamically determined based on one or more categories, such as the number of service providers eligible to submit a bid, the user location, the time of time, a determined importance or severity of the matter, an estimated value of the matter, a projection as to how many service providers will be participating in the auction, and/or other criteria. If the bid period is dynamically determined, it may be rounded or normalized so that the bid period will be a integer multiple of 10 seconds, 15 seconds, 30 seconds, 1 minute, 5 minutes, 2 hours, or other period of time.

At block 808, the auction history/real time status may be accessed. For example, the auction history/real time status may include the number of bids received, identities of the other bidders (e.g., userIDs or pseudonyms), ratings provided by users for the other bidders, the current lowest/best bid (e.g., the lowest amount or contingency percentage being asked to provide the requested service), the time remaining in the auction, a time remaining in the bid period, etc. At block 810, ratings previously provided by service providers regarding the user (e.g., a number rating, a letter rating (e.g., A-F), and/or a comment rating) may be accessed from memory. At block 812, some or all of the information obtained at blocks 808, 810, and from the user (as described elsewhere herein) is transmitted (optionally securely as discussed elsewhere herein to avoid third parties detecting bid requests, detecting bids, and/or modifying bids) to the service provider(s) (e.g., via a service provider system via a webpage, a dedicated application, a text message, an email, or otherwise). Optionally, the service provider is informed that the service provider's bid must be lower/better than an immediately preceding bid for the bid to be valid. A countdown clock indicating how long the service provider has to provide a bid based on the bid period may be provided for display on a service provider terminal. At block 814, a determination is made as to whether any bids have been received within the bid period. If not, optionally the auction is ended. Optionally, a service provider may configure an automatic bidding engine to automatically submit bids at set amounts/increments at specified times and/or a specified period before the auction is scheduled to end.

If a bid is received, at block 816, optionally, service providers that submitted bids (e.g., valid bids) are charged a bid fee for their bid (e.g., the emolument or fee amount determined at block 802). Optionally, a determination is made as to whether a bid is lower/better than a previous bid and if not, the bid may be rejected and optionally the bidder is not charged for the rejected bid. Bid information is transmitted to the user (e.g., via a webpage, a dedicated application, a text message, an email, or otherwise presented via a kiosk or a user terminal). For example, the bid information may include the bid amount, the name of the bidding service provider, a link to the service provider's webpage and/or social media page, service provider contact information, information regarding the number years the service provider has been licensed, user ratings for the service provider, and the like. A control may also be provided via which the user can accept the service provider's bid. Activation of the control (e.g., a link) causes an acceptance indication to be transmitted (e.g., to system 500 illustrated in FIG. 5). At block 818, a determination is made whether the user accepted the bid (e.g., whether an acceptance indication was transmitted from the user's terminal). If a determination is made that the user accepted the bid, the auction is ended. Otherwise, the auction continues.

At block 820, a determination is made as to whether the auction time period has expired. If the auction time period has expired, the process identifies a threshold number of lowest/best bids (e.g., the lowest bid, the three lowest bids, or other number of lowest/best bids), and the bids are transmitted to the user with a ranking indicating which bid is the lowest, which bid is the second lowest, and so on. Optionally, bids older than threshold number of most recent bids are excluded from being transmitted to the user (e.g., bids that are prior to the most recent 15, 10, 5, or other threshold number of most recent bids are excluded from being transmitted to the user). The bids may be transmitted to the user in conjunction with other information, such as the bid amount (which may be in the form of a contingency percentage or in the form of a fixed sum), the name of the bidding service provider, a link to the service provider's webpage and/or social media page, service provider contact information, information regarding the number years the service provider has been licensed, user ratings for the service provider, and the like. The user may then accept a bid, as similarly discussed above with respect to the process illustrated in FIG. 7.

Optionally, if the user does not accept any bid when there are more than a threshold number of service providers bidding (e.g., 2, 3, 4, 5, or other threshold number of services providers), the service providers are refunded their bid fees and the user is charged a fee. Optionally, if the user does not accept any bid when there are less than a threshold number of service providers bidding (e.g., 2, 3, 4, 5, or other threshold number of services providers), the service providers are refunded their bid fees and the user is not charged a fee. Optionally, if the user does not accept the lowest/best bid, but does accept a higher bid, the service provider that submitted the lowest/best bid is refunded its bid fees.

Thus, systems and methods are disclosed for collecting, processing, and distributing information using kiosks and/or user terminals.

Certain embodiments may be implemented via hardware, software stored on media, or a combination of hardware and software. For example, certain embodiments may include software/program instructions/modules stored on tangible, non-transitory computer-readable medium (e.g., magnetic memory/discs, optical memory/discs, RAM, ROM, FLASH memory, other semiconductor memory, etc.), accessible by one or more computing devices configured to execute the software (e.g., servers or other computing device including one or more processors and comprising hardware, wired and/or wireless network interfaces (e.g., cellular, Wi-Fi, Bluetooth, T1, DSL, cable, optical, or other interface(s) which may be coupled to the Internet), content databases, customer account databases, etc.). Data stores (e.g., comprising databases) may be used to store some or all of the information discussed herein in memory.

By way of example, a given computing device may optionally include user interface devices, such as some or all of the following: one or more displays, keyboards, touch screens, speakers, microphones, mice, track balls, touch pads, tilt sensors, accelerometers, biometric sensors (e.g., fingerprint or face recognition sensors for authenticating a user) printers, etc. The computing device may optionally include a media read/write device, such as a CD, DVD, Blu-ray, tape, magnetic disc, semiconductor memory, or other optical, magnetic, and/or solid state media device. A computing device, such as a user terminal, may be in the form of a general purpose computer, a personal computer, a laptop, a tablet computer, a mobile or stationary telephone, an interactive television, a set top box coupled to a display, etc. Certain embodiments may be able to conduct hundreds (or more) of transactions and processes described herein within a second.

While certain embodiments may be illustrated or discussed as having certain example components, additional, fewer, or different components may be used. Processes described as being performed by a given system may be performed by a user terminal or other system or systems. Processes described as being performed by a user terminal may be performed by another system. Data described as being accessed from a given source may be stored by and accessed from other sources. Transmissions described herein may be via a wired and/or wireless network or other communications link. Further, with respect to the processes discussed herein, various states may be performed in a different order, not all states are required to be reached, and fewer, additional, or different states may be utilized.

User interfaces described herein are optionally presented (and user instructions may be received) via a user computing device using a browser, other network resource viewer, or otherwise. For example, the user interfaces may be presented (and user optionally instructions received) via an application (sometimes referred to as an "app"), such as a dedicated app configured specifically for accident reporting and/or communications activities, installed on the user's mobile phone, laptop, pad, desktop, television, set top box, phone, or other terminal. For example, an app may be downloaded to a user mobile device, such as a smart phone. Various features described or illustrated as being present in different embodiments or user interfaces may be combined into the same embodiment or user interface or separated into additional user interfaces. The example user interfaces illustrated herein need not be used. The user voice communications discussed herein may optionally be processed in whole or in part by a voice recognition system in the content of an interactive voice response system. The user voice communication may optionally be responded to by the interactive voice response system or a human agent.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. Further, embodiments may include several novel features, no single one of which is solely responsible for the embodiment's desirable attributes or which is essential to practicing the systems, devices, methods, and techniques described herein. In addition, various features of different embodiments may be combined to form still further embodiments. For example, aspects found in different user interfaces may be combined to form still further user interface.

What is claimed is:

1. A kiosk, comprising:
    a body;
    an antenna mounted to the body;
    two or more weather-sealed displays attached, using bolts and/or brackets, to the body above a first vertical level, wherein display portions of the two or more weather-sealed displays attached to the body above the first vertical level are non-touch and the first vertical level is at least 4 feet;
    a first wireless network interface coupled to the antenna;
    a second network interface;
    a weather-sealed touch display positioned at a second level lower than the first level;
    a camera;
    a microphone;
    a document scanner comprising a document feeder, wherein the document scanner is configured to receive a document via the document feeder, identify a document type for the document, and dynamically determine an image compression level based at least in part on the document type;
    a computing system comprising at least a computing device and non-transitory memory that stores program instructions executable by the computing device to perform operations comprising:
        enable user terminals to wirelessly connect to the first wireless network interface;
        receive via the second network interface content from a remote system;
        display at least a portion of the received content on the two or more weather-sealed non-touch displays attached to the body above the first vertical level;
        display an accident, immigration, and/or matrimonial incident reporting user interface via the touch display positioned at the second level;
        populate at least a portion of the reporting user interface with a user input provided via a keyboard and/or via the microphone;
        perform a geolocation operation to determine location information related to the report;
        securely transmit using the second network interface at least a portion of the user input used to populate the reporting user interface and the location information to a remote system.

2. The kiosk system as defined in claim 1, wherein the kiosk system is configured to detect an accident based at least in part on audible sounds received by the microphone, wherein based at least in part on the detected accident, content is selected and displayed via at least one of the kiosk system displays.

3. The kiosk system as defined in claim 1, further comprising:
    a speech recognition system, the speech recognition system configured to receive user voice input and to populate one or more accident reporting user interface fields.

4. The kiosk system as defined in claim 1, further comprising a base and wheels mounted to the base.

5. The kiosk system as defined in claim 1, further comprising a mounting device configured to enable the kiosk body to be affixed to a sidewalk.

6. A terminal system, comprising:
    a body;
    a plurality of antennas mounted to or within the body;
    at least one touch display;
    a first wireless network interface coupled to a first of the plurality of antennas;
    a second wireless network interface coupled to a second of the plurality of antennas;
    a camera;
    a microphone;
    a document scanner comprising a document feeder, wherein the document scanner is configured to receive a document via the document feeder, identify a document type for the document, and dynamically determine an image compression level based at least in part on the document type;
    a computing system comprising at least a computing device and non-transitory memory that stores program instructions executable by the computing device to perform operations comprising:
        enable electronic devices to wirelessly connect to the first wireless network interface;
        receive via the second wireless network interface content from a remote system;
        display at least a portion of the received content on the touch display;
        display an accident, immigration, and/or matrimonial incident reporting user interface via the touch display;
        populate at least a portion of the reporting user interface with a user input provided via a keyboard and/or via the microphone;
        perform a geolocation operation to determine location information related to the report;
        securely transmit using the second wireless network interface at least a portion of the user input used to populate the reporting user interface and the location information to a remote system.

7. The terminal system as defined in claim 6, wherein the terminal system is configured to detect an accident based at least in part on audible sounds received by the microphone, wherein based at least in part on the detected accident, content is selected and displayed via the touch display.

8. The terminal system as defined in claim 6, further comprising:
    a speech recognition system, the speech recognition system configured to receive user voice input and to populate one or more accident reporting user interface fields.

9. The terminal system as defined in claim 6, wherein the body is weather sealed.

10. The terminal system as defined in claim 6, wherein at least partly in response to receiving user input used to populate the reporting user interface, the remote system:
    identifies service providers that can provide service related to the reported incident to the user that meet one or more criteria;
    transmits over a network a notification to destinations associated with the identified service providers regarding: the reported incident subject matter, a start time for a reverse auction to bid on providing the user with reported incident related service, an auction length, a bid period, and a bid emolument that will be charged for a submitted bid, the notification further comprising a control via which a service provider may indicate an interest in participating in the reverse auction;
    at least partly in response to an interest indication received from a given service provider terminal, provides the given service provider via a service provider terminal with anonymized user reported information;

in response to receipt of a first bid comprising a first bid amount, transmits the first bid amount to destinations associated with service providers that indicated an interest in participating in the reverse auction, wherein the first bid amount is displayed in association with a countdown clock corresponding to the bid period;

determines whether another bid was received within the bid period;

at least partly in response to a determination that another bid was not received within the bid period, terminates the auction;

transmits to the user terminal a subset of the bids, including at least a lowest bid, received in association with information, including a respective service provider website link, regarding the service providers that submitted the subset of bids.

11. The terminal system as defined in claim 6, wherein at least partly in response to receiving user input used to populate the reporting user interface, the remote system:

identifies a first plurality of service providers that can provide service related to the reported incident to the user that meet one or more criteria;

transmits over a network a notification to destinations associated with the identified first plurality of service providers regarding: the reported incident subject matter, a start time for a reverse auction to bid on providing the user with a report incident related service, an auction length, a bid period, and a bid emolument that will be charged for a submitted bid;

provides at least a portion of the first plurality of service providers with anonymized user reported information;

in response to receipt of a first bid comprising a first bid amount, transmits the first bid amount to destinations associated with at least a portion of the first plurality of service providers, wherein the first bid amount is displayed in association with a countdown clock corresponding to the bid period;

determines whether another bid was received within the bid period;

at least partly in response to a determination that another bid was not received within the bid period, terminates the auction;

transmits to the user terminal one or more of the bids received in association with information regarding respective service providers;

transmits non-anonymized user reported information to the service provider that submitted a winning bid.

12. The terminal system as defined in claim 6, wherein at least partly in response to receiving user input used to populate the reporting user interface, the remote system:

identifies one or more service providers;

transmits a notification to destinations associated with the identified one or more service providers regarding: the reported incident subject matter, a start time for a reverse auction to bid on providing the user with a report related service, an auction length, a bid period, and a bid emolument that will be charged for a submitted bid;

provides at least a portion of the one or more service providers with anonymous user reported information;

in response to receipt of a first bid comprising a first bid amount, transmits the first bid amount to destinations associated with at least a portion of the one or more service providers, wherein the first bid amount is displayed in association with a countdown clock corresponding to the bid period;

determines whether another bid was received within the bid period;

at least partly in response to a determination that another bid was not received within the bid period, terminates the auction;

transmits to the user terminal at least a lowest bid received in association with information regarding the respective service provider that submitted the lowest bid.

13. The terminal system as defined in claim 6, wherein at least partly in response to receiving user input used to populate the reporting user interface, the remote system:

identifies a one or more service providers;

transmits a notification to destinations associated with the identified one or more service providers regarding: the reported incident subject matter, a start time for a reverse auction to bid on providing the user with a reported incident related service, an auction length, a bid period, and a bid emolument that will be charged for a submitted bid;

provides at least a portion of the one or more service providers with anonymized user reported information;

in response to receipt of a first bid comprising a first bid amount, transmits the first bid amount to destinations associated with at least a portion of the one or more service providers, wherein the first bid amount is displayed in association with a countdown clock corresponding to the bid period;

determines whether another bid was received within the bid period;

at least partly in response to a determination that another bid was not received within the bid period, terminates the auction;

transmits to the user terminal at least a lowest bid received in association with information regarding the respective service provider that submitted the lowest bid.

* * * * *